United States Patent
Shikata et al.

(10) Patent No.: US 6,705,672 B2
(45) Date of Patent: Mar. 16, 2004

(54) VEHICULAR AIR-CONDITIONING DUCT STRUCTURE AND FORMING METHOD, AND VEHICULAR ELECTRIC-WIRING FIXING STRUCTURE

(75) Inventors: Kazushi Shikata, Kariya (JP); Tomohiro Kamiya, Takahama (JP); Koichi Ito, Kariya (JP); Takahiro Yoshida, Niwa-gun (JP); Mikio Hirano, Obu (JP); Satoshi Mizutani, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/118,743

(22) Filed: Apr. 9, 2002

(65) Prior Publication Data

US 2002/0145309 A1 Oct. 10, 2002

(30) Foreign Application Priority Data

Apr. 10, 2001 (JP) .................................... 2001-111928
May 30, 2001 (JP) .................................... 2001-163156
Feb. 15, 2002 (JP) .................................... 2002-038466

(51) Int. Cl.[7] ............................................. B60R 27/00
(52) U.S. Cl. .................... 296/208; 296/70; 296/190.09; 180/90; 280/752; 454/121; 454/143
(58) Field of Search ................... 296/187.03, 190.09, 296/208, 70; 180/90; 280/752, 751; 454/121, 127, 143

(56) References Cited

U.S. PATENT DOCUMENTS

| 5,312,133 A | * | 5/1994 | Pietila et al. ............... 180/90 |
| 5,549,344 A | | 8/1996 | Nishijima et al. |
| 5,566,721 A | * | 10/1996 | Breese ....................... 138/145 |
| 5,678,877 A | | 10/1997 | Nishijima et al. |
| 5,685,595 A | | 11/1997 | Nishijima et al. |
| 5,712,764 A | | 1/1998 | Baker et al. |
| 5,979,965 A | | 11/1999 | Nishijima et al. |
| 6,123,616 A | * | 9/2000 | Otsuka ........................ 296/208 |
| 6,270,600 B1 | | 8/2001 | Wycech |
| 6,351,962 B1 | * | 3/2002 | Mizutani et al. ............ 180/90 |
| 6,409,590 B1 | * | 6/2002 | Suzuki et al. ............... 296/70 |
| 2003/0122403 A1 | | 7/2003 | Bancheriau |

FOREIGN PATENT DOCUMENTS

| EP | 0 662 901 | 3/1996 |
| EP | 1 068 966 | 1/2001 |
| EP | 1 075 972 | 2/2001 |
| FR | 2789043 | 8/2000 |

OTHER PUBLICATIONS

Search Report dated Apr. 9, 2003 in FR 0204476.

* cited by examiner

Primary Examiner—D. Glenn Dayoan
Assistant Examiner—Lori L Coletta
(74) Attorney, Agent, or Firm—Harness, Dickey & Pierce, PLC

(57) ABSTRACT

An air-conditioning duct structure is included in a vehicular dash beam member. Material for the duct is made of a heat insulating and sound absorbing material and is adhered onto the surface of a sheet material for the beam member which is then bent into a semi-tubular shape so that the material for the duct is positioned inside thereby forming beam member bodies. Beam member bodies are combined by joining their joining surfaces that face each other to thereby form a tubular closed sectional shape. Achieving vibration attenuation, noise absorption and the heat insulating functions with an inner surface sheet member of an air conditioning duct is achievable. An air conditioning duct extending across a vehicle's width is formed by joining a metal reinforcing member and a resin cover. The sheet member is put between the reinforcing member and the cover.

27 Claims, 16 Drawing Sheets

VEHICULAR AIR-CONDITIONING DUCT STRUCTURE AND FORMING METHOD, AND VEHICULAR ELECTRIC-WIRING FIXING STRUCTURE

CROSS REFERENCE TO RELATED APPLICATIONS

This application is based on, and incorporates herein by reference, Japanese Patent Application Nos. 2001-111928 filed on Apr. 10, 2001; 2001-163156 filed on May 30, 2001; and 2002-038466 filed on Feb. 15, 2002.

BACKGROUND OF THE INVENTION

1. Field of the Invention

The present invention relates to a vehicular air-conditioning duct structure and forming method therefor and an electrical wiring fixing structure for fixing electrical wiring internally of the vehicular instrument board and dashboard.

2. Description of the Related Art

Inside of an instrument board forward of a passenger compartment (in the vicinity of a partition wall for dividing between the engine room and the passenger compartment), a beam member (reinforcing bar) extending with respect to the width of a vehicle is provided. In addition to a reinforcing member arranged across the vehicle's width direction, an electrical wiring and an electrical wiring harness is provided. The reinforcing member is for strengthening the body of the vehicle and for supporting a steering structure of the vehicle. The beam member plays a part as a structural member for supporting a steering shaft and as a structural support member for the vehicle. On the reinforcing structural member (reinforcing beam), apparatuses such as electrical wiring and a wiring harness are mounted. The electrical wiring or the wiring harness can alternatively or coincidentally be mounted to the instrument board. Generally, clips are used to mount the wiring and the wiring harness.

An interior air conditioning unit of a vehicular air conditioning apparatus is normally arranged at the central portion with respect to the width of the vehicle inside of the instrument board forward of the passenger compartment. Conditioned air adjusted in temperature by the interior air conditioning unit is blown off from the center face blow-off port arranged in the central portion with respect to the width of the vehicle of the instrument board toward the face portion of an occupant in the central portion in the passenger compartment. The conditioned air is blown off from the side face blow-off ports arranged in the left and right ends with respect to the width of the vehicle of the instrument board toward the faces of occupants in the left and right ends in the passenger compartment.

Accordingly, an air conditioning duct (side face duct) is necessary, which leads the conditioned air from the air conditioning unit in the passenger compartment positioned in the central portion with respect to the width of the vehicle within the instrument board to the side face blow-off ports positioned in the left and right ends in the passenger compartment.

The air conditioning duct is generally arranged so as to extend nearly parallel with the beam member inside of the instrument board. It is desirable that a packing, such as a forming resin, is used as an insulator inside the duct or around the outside of the duct, or both, to heat-insulate the duct. The packing will also serve to attenuate vibrations that propagate in the air conditioning duct, and for absorbing noises propagating in the duct. In order to fix the packing on the inner surface of the duct, the packing must be adhered with an adhesive, or the like, and this process is troublesome.

The air conditioning duct requires a mounting space separately from the beam member inside of the instrument board, resulting in making the vehicle mounting properties of the air conditioning duct worse.

In view of the foregoing, as a constitution for including the air conditioning duct in the beam member, a constitution has been proposed so that mounting spaces for the air conditioning duct and the beam member are used in common thereby to improve the vehicle mounting properties of the air conditioning duct.

According to the Related Art, the air conditioning duct is molded in advance, and the molded duct is inserted from the sides of the beam member (the left and right ends with respect to the width of the vehicle). The inserting work of the air conditioning duct is very cumbersome. It is necessary to make a sectional area of the air conditioning duct sufficiently smaller than that of the beam member in order to facilitate the duct inserting work. However, the blow-off air quantity of the air-conditioning air caused by the small sectional area, and the air conditioning performance is lowered.

According to a further proposal described in Laid-Open French Patent Application No. 2789043, a beam member is formed to be divided into two upper and lower beam member bodies, and the beam member bodies and the air conditioning duct are mounted an air conditioning duct is molded in advance, the air conditioning duct is sandwiched between the two upper and lower bodies, and then the two upper and lower beam members bodies are joined integrally.

Continuing, for achieving further space saving and thinner or smaller structures, compared with the structure in which an air conditioning duct is arranged within a tubular reinforcing member to save a space (Japanese Translation of PCT Application No. H8-502002), there has been heretofore known an air conditioning duct of the structure in which a reinforcing member serves as part of the air conditioning duct. In the structure, the functions of heat insulation, vibration attenuation, and noise absorption are required, since the material with high rigidity such as metal used for the reinforcing member serving as part of the air conditioning duct is generally high in heat conductivity, conducive to vibration propagation, and sound transmitting, propagation or reflectivity.

When the clips of the prior art are used for fixing the electrical wiring, the fixing must be done while a user holds, grips and positions the wiring by hand. This creates a difficult situation for an installer. Out of the structure for improving the fixing workability, the structure in which there is provided a housing member extending along the path of the electric wiring in the instrument board and accommodating the electric wiring as described in JP-A-52683, the cost for the housing member is higher than that of the clips. Further, as in the invention described in U.S. Pat. No. 5,712,764, if the electric wiring is molded to the instrument board, the fitting position of the electric wiring on the instrument board has to be designed depending on design of the instrument board.

Therefore, the air conditioning duct is required to be molded as a single body. In addition, it is necessary that the cumbersome mounting work in which the beam member bodies and the air conditioning duct are mounted, while aligning the beam member bodies and the air conditioning duct, thus increasing the manufacturing cost.

SUMMARY OF THE INVENTION

With regard to that described above, it is an object of the present invention to reduce a cost of the air conditioning duct structure included in a vehicle beam member.

A further object of the invention is to provide an air conditioning duct structure in which an internal space of the beam member is effectively used as a space for accommodating an air conditioning duct.

It is another object of the present invention to produce an air conditioning duct that attenuates vibration and noise and thermally insulates the inner surface of such an air conditioning duct.

It is yet another object of the present invention to improve the ability of securing electric wiring to a reinforcing member.

For achieving the above-described objects, according to a first embodiment of the invention, a vehicular air-conditioning duct structure includes a beam member having at least two beam member bodies, also called beam members, divided in the longitudinal direction of the beam member, and a material for a duct integrated on an inner surface of the beam member bodies. The at least two beam member bodies are combined to form a tubular closed sectional shape. It is not necessary to mold the air conditioning duct into a duct shape in advance. Therefore, the molding step and the step of mounting the air conditioning duct into the beam member are unnecessary to considerably improve the productivity for manufacturing the air conditioning duct structure. Moreover, since the material for the duct is integrated on the material surface of the beam member bodies, it is not necessary to set an air gap for facilitating the duct inserting work into the beam member, and the whole space of the beam member is effectively used as a space for the air conditioning duct.

According to a second aspect of the invention, the material for the duct is laminated and adhered onto the inner surface of the beam member bodies. According to a third aspect of the invention, the material for the duct is integrally mounted by blowing a fluid material on the inner surface of the beam member bodies. Since the material for the duct is fixedly adhered directly on the surface of the material for the beam member, the yield of the material for the duct is improved. According to a fourth aspect of the invention, the material for the duct is integrated on the surface of a sheet material for the beam member and the material for the beam member is bent into a semi-tubular shape so that the material for the duct is positioned inside to form at least two beam member bodies.

According to a fifth aspect of the invention, the material for the duct is integrated on the surface of the sheet material for the beam member, the material for the beam member is bent into a semi-tubular shape so that the material for the duct is positioned inside to form one of at least two beam member bodies. Another beam member body is formed in the form of maintaining nearly a flat, planer shape of the material for the beam member integrated with the material for the duct.

According to a sixth aspect of the invention, a vehicular air-conditioning duct structure included in a beam member is molded into a predetermined shape. Since the duct bodies are molded into a predetermined shape in advance and are incorporated into the beam member bodies, the incorporating step requires working of the duct bodies, unlike the first to fifth aspects.

In the seventh aspect of the invention, one beam member body has the characteristics of the first aspect of the invention, and the other beam member body has the characteristics of the sixth aspect of the invention, thereby exhibiting a combination of the operation and effect of the first aspect and the sixth aspect of the invention.

According to an eighth aspect of the invention, the material for the duct comprises a material having at least thermal insulating properties. According to a ninth aspect of the invention, the material for the duct comprises a heat insulating and sound absorbing material.

According to a tenth aspect of the invention, joining surfaces, to which the material for the beam member is exposed directly, are set to the end surfaces of at least two beam member bodies, and the end surfaces of at least two beam member bodies are joined at the joining surfaces. In the joining surfaces of the beam member bodies, the surfaces of the material for the beam member are placed in contact with each other directly and joined, and the soft material for the duct is not interposed between the joining surfaces. Therefore, there is sufficient joining strength and means such as welding may be employed.

According to an eleventh aspect of the invention, gradually changed portions for gradually changing the tubular closed sectional shape in the vicinity of the joining surfaces are formed adjacent to the joining surfaces, and the material for the duct is compressed by the gradually changed portions.

According to a twelfth aspect of the invention, the material for the duct is integrated on the whole surface of one side of the sheet material for the beam member, and the end surfaces of at least two beam member bodies are joined with the material for the duct interposed therebetween. This increases a sealing function of the beam members.

According to a thirteenth aspect of the invention, closed portions for closing an internal space of the beam member are molded integrally on both ends of the beam member bodies. Thereby, the internal space of the beam member is closed without arranging a separate cap member in both ends in the longitudinal direction of the beam member. According to a fourteenth aspect of the invention, separate side brackets are joined to both ends of the beam member.

According to a fifteenth aspect of the invention, side brackets are integrally molded so as to be spread radially outward on both ends of the beam member bodies, and openings at both ends of the beam member are closed by a separate cap member.

According to a sixteenth aspect of the invention, the beam member is arranged inside of a vehicle instrument board and is used as a structural member for supporting a vehicle steering system, and both ends, in the longitudinal direction of the beam member, are secured to the vehicle body by side brackets.

According to a seventeenth aspect of the invention, wiring holding portions for holding vehicle wiring along the longitudinal direction of the beam member are molded integrally with the beam member. The wiring holding portions may be integrally molded on only one (lower beam member body) of two beam member bodies.

According to an eighteenth aspect of the invention, wiring protective members arranged inside of the wiring holding portions to coat or surround the vehicle wiring are integrally molded with the material for the duct to protect the wiring.

According to a nineteenth aspect of the invention, a wiring protective member arranged inside of the wiring holding portions to coat or surround the vehicle wiring are molded separately from the material for the duct.

According to a twentieth aspect of the invention, after a ventilation path partitioning member for partitioning a ventilation path inside of the beam member is incorporated between two beam member bodies, the end surfaces of two beam member bodies are joined.

According to a twenty-first aspect of the invention, an opening shape on the ventilation path outlet side of the ventilation path partitioning member is made to be a flat shape along the longitudinal direction of the beam member.

According to a twenty-second aspect of the invention, a pitch of a joining portion for joining the end surfaces of at least two beam member bodies is set to a value not more than 200 mm. According to the experiment and study made by the present invention, it has been found that when the pitch P of the joining portion is set to a value not more than 200 mm, the rigidity of the beam member increases to be able to make the resonant frequency higher. Therefore, vibrations caused by the resonant phenomenon of the beam member when in the mounted state on the vehicle, are suppressed.

According to a twenty-third aspect of the invention, a method of forming a vehicle air-conditioning duct structure included in a beam member is proposed.

According to a twenty-fourth aspect of the invention, a sheet material is used as a material for the duct, the sheet material for the duct is laminated on the surface of the sheet material for the beam member to bond the materials to each other. Thereby, the vehicular air conditioning duct structure is formed by using the sheet material as a material for the beam member and the material for the duct.

According to a twenty-fifth aspect of the invention, a fluid material is used as a material for the duct, and the fluid material is blown directly on the surface of the sheet material for the beam member to integrally adhere the material for the duct.

Continuing, for achieving the above-described objects, there is provided an arrangement wherein air passages extending in the vehicle width direction (across the width of the vehicle) internally of a vehicular instrument board are formed by joining a first division member and a second division member and divided by a surface extending in the vehicle width direction. A sheet member located on the inner surface of at least one division member out of the first and second division members and having at least one function out of the functions of attenuating vibrations propagating one division member, absorbing noises propagating within the air passages, and heat-insulating air within the air passages. The sheet member is normally put between the first and second division members and fixed.

According to the present invention, the other division member out of the first and second division members is joined with a reinforcing member whereby an opening of the reinforcing member whose section perpendicular to the vehicle width direction is an open sectional shape, is to be closed by the other division member. Since the reinforcing member serves as part of the air conditioning duct, further space saving and weight reduction can be achieved as compared with the structure of the air conditioning duct described in Japanese Translation of PCT Application No. H8-502002.

For minimization and weight reduction of the reinforcing member, preferably, the reinforcing member is made of metal (for example, such as magnesium, aluminum, iron, etc.). However, the reinforcing member of the present invention is not limited to be made of metal, but may be made of resin such as glass-contained polypropylene.

Since foaming resin is a material excellent in the heat-insulating function and the noise absorbing function, the sheet member may be suitably made of a foaming resin as in the invention of claim. Further, where the sheet member is provided to fix the electric wiring, the foaming resin may be used to thereby enhance the effect for protecting the electric wiring.

Preferably, the air passages formed by the first and second division members cause air to flow toward at least one blow port opening out of the side face blow port opening and the side defroster blow port opening. The side face blow port opening is a known blow port opening provided on both ends, in the vehicle's width direction, of the instrument board to blow air-conditioning air toward the upper half of the occupant's body. The side defroster blow port opening is a known blow port opening provided on both ends of the vehicle instrument board to blow air-conditioning air toward the inside of the side window glass of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS (First Embodiment)

Figure 1:
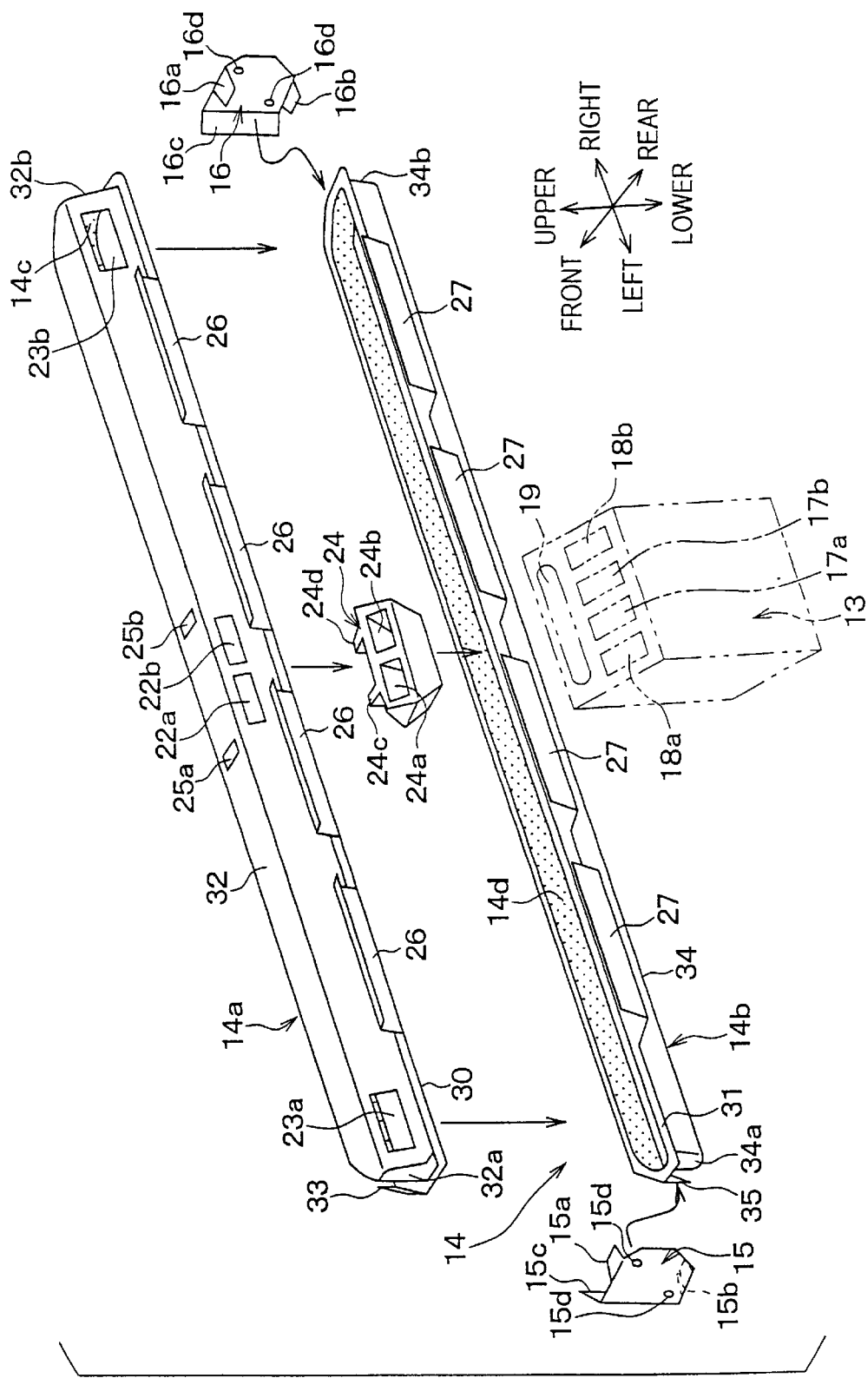
FIG. 1 is an exploded perspective view of a vehicular air conditioning duct structure according to a first embodiment of the present invention.

FIG. 1 is an exploded view of an air conditioning duct structure according to a first embodiment. The air conditioning duct structure shown in FIG. 1 is mounted inside of an instrument board (dashboard) portion shown in FIG. 2. It is noted that arrows in respective figures explained hereinafter designate directions of left and right, upper (up) and lower (down), and front and rear portions of a vehicle when the parts are properly mounted in a vehicle.

Figure 2:
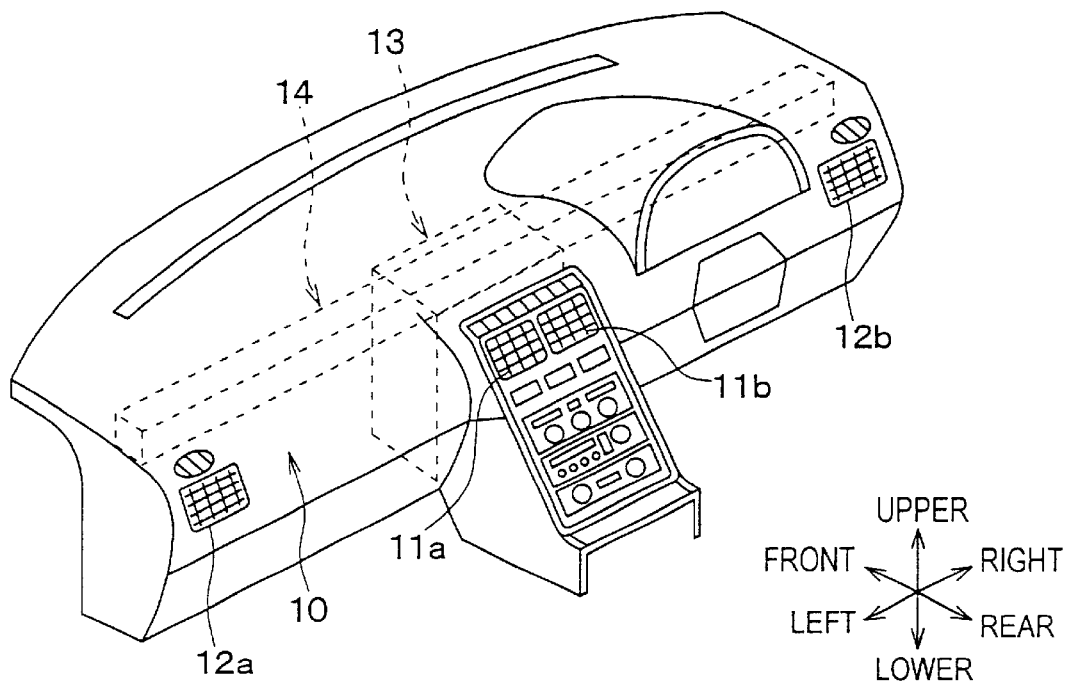
FIG. 2 is a perspective view of an instrument board for explaining the first embodiment.

An instrument board 10 shown in FIG. 2 is positioned in the front portion within the passenger compartment and has instruments, audio apparatuses, etc. mounted thereon. In approximately the central portion of an automobile, with reference to the width of a vehicle, in the instrument board 10, center face blower ports 11a, 11b from which air conditioning air is blown toward the face of a vehicle occupant are arranged, and in both end portions (left and right) in the instrument board 10, side face blow ports 12a, 12b are arranged from which air conditioning air is blown toward the face of an occupant or side window glass of the vehicle.

An air conditioning unit 13 of the vehicular air conditioning apparatus is arranged inside of the instrument board 10. The air conditioning unit 13 is positioned in approximately a central position, with respect to the width of the vehicle, to adjust the temperature or humidity of air blown into the passenger compartment. The air conditioning unit 13 encases apparatuses such as a cooling heat exchanger (evaporator) and a heating heat exchanger (hot water type heater core). The air conditioning unit 13 may be constructed as a complete center-placed type, integrally housing or comprising a blower unit to which inside air or outside air is introduced and switched in order that it may be blown. Further, the air conditioning unit 13 may be constructed as a semi-center placed type in which the blower unit is arranged in an offset manner on the side of a passenger seat relative to the air conditioning unit 13.

On the other hand, a beam member (reinforcing bar) 14 extending the width of the vehicle is provided above the air conditioning unit 13 inside of the instrument board 10. The beam member 14 is a structural member whose main object is to support a steering system (not shown) in which side brackets 15, 16 (FIG. 1) made of metal, such as an aluminum alloy, are mounted integrally on both ends thereof with respect to the width of the vehicle. Both ends of the beam member 14 are secured to the vehicle body by the side brackets 15, 16.

Figure 5A:
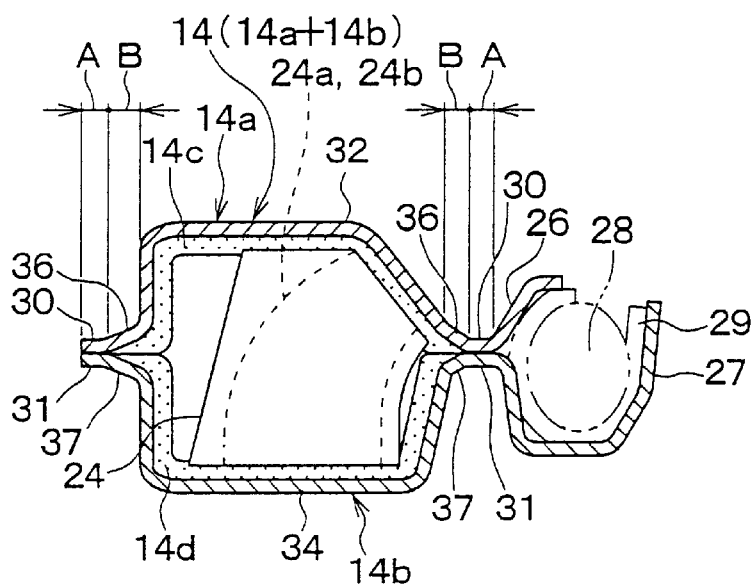
FIG. 5A is a cross-sectional view of a joining portion and a seal portion of the upper and lower beam members in the first embodiment.

The beam member 14 is hollow, in which two beam member bodies 14a, 14b, divided in the longitudinal direction of beam member 14, are joined to form a closed, tubular sectional shape. More specifically, the closed, tubular sectional shape is a shape that approximates a rectangular shape as illustrated in FIG. 5A to be described later. Here, material for the upper and lower beam member bodies 14a, 14b is a sheet metal such as an aluminum alloy. The material is subjected to bending to conform to a semi-tubular shape integral with material for the duct bodies 14c, 14d positioned inside thereof.

The duct bodies 14c, 14d are provided on the hollow, closed sectional-shaped internal side wall whereby the air conditioning duct structure can be included in the beam member 14. Material for the duct bodies 14c, 14d comprises a heat insulating sound absorbing material which has an air layer and is bendable and flexible.

Specifically, as a material for the duct bodies 14c, 14d, resin foam materials such as foam urethane, foam polypropylene or foam polyethylene are well-suited, but are not exclusive materials. In these resin foam materials, the material itself is foam thereby providing a layer of air and exhibit a heat insulating function. Further, the resin foam materials have a sound absorbing effect due to the adjustment of the foam thickness, quality or type. Here, material mainly exhibiting only the heat insulating function such as hard urethane resin may be used as a material of the duct bodies 14c, 14d. The method of forming the air conditioning duct structure included in the beam member 14 will be specifically described later.

Continuing, two center face openings 17a, 17b are opened in the central portion in the width (left and right) direction of the vehicle, and side face openings 18a, 18b are opened on the left and right sides of the two center face openings 17a, 17b. A defroster opening 19 is opened on the forward side of the vehicle and forward of the face openings 17a, 17b, 18a and 18b.

Figure 3:
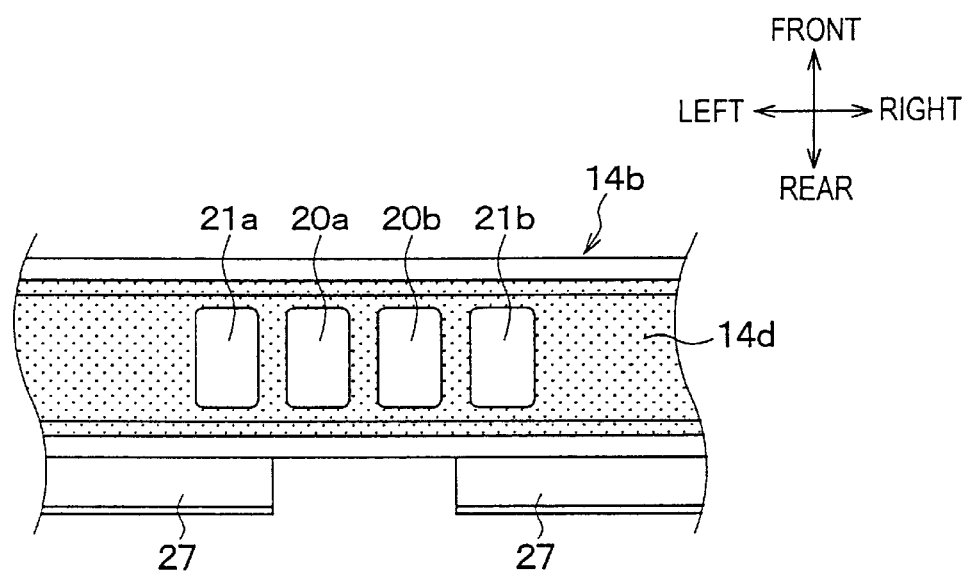
FIG. 3 is a plan view of a central portion of a lower beam member in the first embodiment.

As shown in FIG. 3, in the central portion, with reference to the width of the vehicle, in the bottom portion of the lower beam member body 14b, four openings 20a, 20b, 21b, 21b are present. The two openings 20a, 20b in the central portion thereof, are openings for the center face which are in communication with the center face openings 17a, 17b, and the openings 21a, 21b on the left and right sides are openings for the side face which are in communication with the side face openings 18a, 18b. It is noted that a defroster duct (not shown) is connected to the defroster opening 19.

In the wall surface in the rearward side of the vehicle of the upper beam member body 14a, two center face outlets 22a, 22b are opened to the central portion and the left and right sides of the vehicle, respectively. Side face outlet openings 23a, 23b are opened in the vicinity of both end portions, a left end and a right end.

A ventilation path partitioning member (center cap member) 24 is arranged in the central portion of the vehicle, with respect to width, at an interior of the beam member 14. The ventilation path partitioning member 24 is molded to a box shape or box-like shape having two center face passages 24a, 24b. The ventilation path partitioning member 24 is molded of a resin material having rigidity, and is sandwiched and fixed between the upper and lower beam member bodies 14a, 14b. Here, the ventilation path partitioning member 24 is sandwiched and fixed in a positional relation such that the lower ends of the center face passages 24a, 24b are in fluid communication with (i.e. mated with) the openings 20a, 20b for the center face of the lower beam member body 14b. The upper ends of the center face passages 24a, 24b are in fluid communication with (i.e. mated with) the center face outlet openings 22a, 22b of the center face of the upper beam member body 14a.

It is noted that in the upper beam member body 14a, two locating guide portions 25a, 25b are projected and molded integrally, in the downward direction. In the ventilation path partitioning member 24, stop parts 24c, 24d stopped by the guide portions 25a, 25b are integrally molded. Accordingly, the stop parts 24c, 24d are stopped at the guide portions 25a, 25b therefore, the ventilation path partitioning member 24 can be located with respect to the width of the vehicle. The guide portions 25a, 25b are seen as if holes in FIG. 1, but the projection shape compromises the view of the inside of 25a and 25b, which are actually recessed and seen when viewed from directly above each guide portion 25a, 25b.

The two center face outlets 22a, 22b which open to the wall surface on the backward side of the vehicle of the upper beam member body 14a are connected to the center face blow ports 11a, 11b shown in FIG. 2. The two side face outlet openings 23a, 23b which open in the vicinity of both ends of the upper beam member body 14a, with respect to the width of the vehicle, are connected to (mated with) the side face blow ports 12a, 12b shown in FIG. 2.

In the semi-tube shaped ends of the upper and lower beam member bodies 14a, 14b, wiring holding portions 26, 27 are molded integrally at parts on the backward side of the vehicle. The wiring holding portions 26, 27 are provided to hold vehicular electric wiring 28 (FIG. 5A), with respect to the width of the vehicle, within the instrument board 10 along the beam member 14. The upper wiring holding portion 26 is molded into an inverted "L" shape portion to hold the upper side of the vehicular electric wiring 28. The lower wiring holding portion 27 is molded into a mating "L" shape to hold the lower side of the vehicular electric wiring 28. The upper and lower wiring holding portions 26, 27 are divided into a plurality of portions, four in FIG. 1 for example, with predetermined spacing between each holding portion, with respect to the width of the vehicle. Between the wiring holding portions 26, 27, a branch or portion of wiring of the vehicular electric wiring 28 can be removed from the predetermined spacing portion.

Although not shown in FIG. 1, a stay for supporting a steering system is mounted by means of screws on a part on the driver's seat side (assuming a right-hand drive vehicle, the part close to the right side in FIG. 1) in the beam member 14 so as to be able to support the steering system. Further, the upper end of an un-illustrated center brace (support column member) is mounted by means of screws in approximately a central portion in the beam member 14. The lower end of the center brace is secured to a floor portion of the vehicle body by means of fastening means such as bolts.

Next, the method of forming the air conditioning duct structure according to the first embodiment will be described in detail in order of the steps.

Figure 4C:
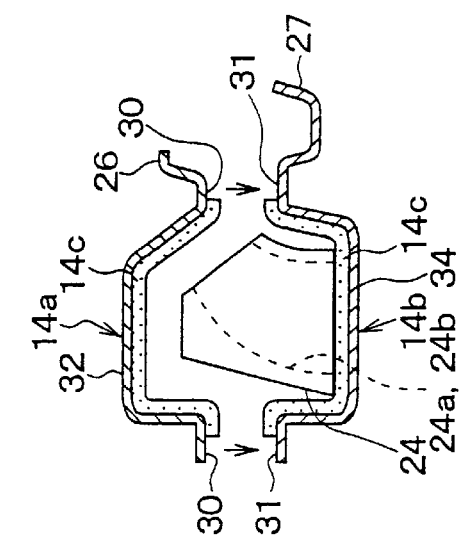
FIG. 4C is a view showing a molding step of the upper and lower beam members in the first embodiment.
Figure 4B:
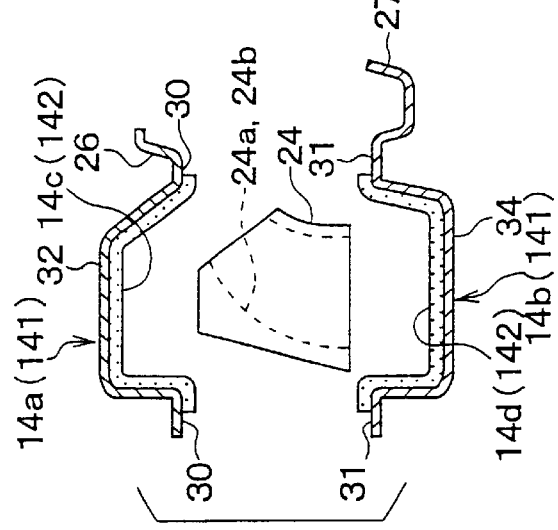
FIG. 4B is a view showing a molding step of the upper and lower beam members in the first embodiment.
Figure 4A:
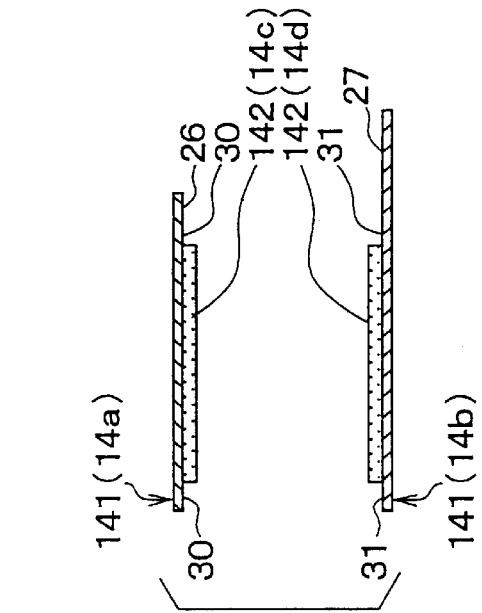
FIG. 4A is a view showing a molding step of the upper and lower beam members in the first embodiment.

(1) The step of cutting an external shape of a material for the upper and lower beam member bodies 14a, 14b and a material for the upper and lower duct bodies 14c, 14d With respect to the materials for the upper and lower beam member bodies 14a, 14b and for the upper and lower duct bodies 14c, 14d, the external shape is cut into a rectangular shape (semi-tube shaped developed shape) of a predetermined size from the respective sheet materials. Here, FIG. 4A shows the state after the external shapes of materials 141, 142 for the upper and lower beam member bodies 14a, 14b and for the upper and lower duct bodies 14c, 14d have been cut and laminated. The external shape of the sheet material 141 for the upper and lower beam member bodies 14a, 14b is larger by a predetermined amount than the external shape of the sheet material 142 for the upper and lower duct bodies 14c, 14d. This is because parts 30, 31, 26, and 27, to be described later, to which the metal surface of the material 141 is exposed directly, are formed on the upper and lower beam member bodies 14a, 14b.

(2) Step of integrating the material 141 for the upper and lower beam member bodies 14a, 14b with the material 142 for the upper and lower duct bodies 14c, 14d As shown in FIG. 4A, the material 142 for the upper and lower duct bodies 14c, 14d is laminated, connected and secured to the side to be the internal surface of the material 141 for the upper and lower beam member bodies 14a, 14b. At this time, since the material 141 for the upper and lower beam member bodies 14a, 14b is larger than the material 142 for the upper and lower duct bodies 14c, 14d, the duct bodies 14c, 14d are not positioned at the parts 30, 31 to be the joining surfaces of the beam member bodies 14a, 14b and the part constituting the wiring holding portions 26, 27, but the metal surfaces of the upper and lower beam member bodies 14a, 14b are exposed directly thereto.

(3) Step of boring ventilation path openings relative to the materials 141, 142

As shown in FIG. 4A, after the material 142 for the duct bodies 14c, 14d has been adhered and secured to the internal surface of the material 141 for the beam member bodies 14a, 14b, boring of the openings 22a, 22b, 23a, and 23b relative to the material 141 for the upper beam member body 14a is carried out, and boring of the openings 20a, 20b, 21a, and 21b relative to the lower beam member body 14b is carried out.

At this time, the boring of the openings can be carried out relative to the materials 141, 142 simultaneously extending through the material 141 for the beam member bodies 14a, 14b and the material 142 for the duct bodies 14c, 14d. Therefore, it is not at all necessary to carry out, in the mounting step, locating between the ventilation path opening on the beam member side and the ventilation path opening on the duct material side, as in prior art.

(4) Step of molding the upper and lower beam member bodies 14a, 14b

Subsequently, the material 141 for the upper and lower beam member bodies 14a, 14b is molded into a semi-shaped sectional shape shown in FIG. 4B by press molding. The press molding includes not only simple bending but also drawing for molding the semi-tube shape.

Here, the molding shape will be specifically explained. The semi-tubular portion 32 is formed on the upper beam member body 14a by drawing, the flat joining surface 30 is formed on the end portion of the semi-tubular portion 32, and the wiring holding portion 26 is formed by bending into the inverted-L shape, the end portion (joining surface 30) of the semi-tubular portions 32 outward. Further, the guide portions 25a, 25b shown in FIG. 1 are molded into a projecting shape which projects to the inside of the semi-tubular portion 32 in the central portion, with respect to the width of the vehicle, in the upper beam member body 14a.

The closed portions 32a, 32b (FIG. 1) are molded integrally by drawing in continuation with the semi-tubular portion 32 on both ends with respect to the width of the vehicle in the upper beam member 14a. The closed portions 32a, 32b are provided to close both ends with respect to the width of the vehicle of the semi-tubular portion 32.

In both end portions, with respect to the width of the vehicle, of the upper beam member 14a, securing parts 33 (FIG. 1) for securing side brackets, to be described later, are integrally formed by bending from the end of the semi-tubular portion 32. It is noted that FIG. 1 shows only the securing part 33 on the left end and does not show the securing part 33 on the right end.

Subsequently, also in the lower beam member body 14b is formed the semi-tubular portion 34, the closed portions 34a, 34b, the securing part 35, the flat joining surface 31, the gutter-like wiring holding portion 27 and so on, similarly to that mentioned above.

(5) Step of mounting the ventilation path partitioning member (center cap member) 24

The ventilation path partitioning member 24 is placed on the bottom surface of the semi-tubular portion 34 of the lower beam member body 14b so that the two center face passages 24a, 24b of the ventilation path partitioning member 24 coincide with the openings for center face 24a, 24b of the lower beam member body 14b. FIG. 4C shows the mounting state of the ventilation path partitioning member 24.

Subsequently, the end surface (joining surface 30) of the semi-tubular portion 32 of the upper beam member body 14a is placed to face the end surface (joining surface 31) of the semi-tubular portion 34 of the lower beam member 14b, and the end surface of the semi-tubular portion 32 of the upper beam member 14a is mounted on the end surface of the semi-tubular portion 34 of the lower beam member 14b. During the course of this mounting, the locating guide portions 25a, 25b of the upper beam member 14a are stopped at the stop parts 24c, 24d (FIG. 1) of the ventilation path partitioning member 24, whereby the ventilation path partitioning member 24 can be located accurately to a predetermined position with respect to the width of the vehicle. The ventilation path partitioning member 24 is sandwiched and fixed between the upper and lower beam members 14a, 14b.

Figure 5B:
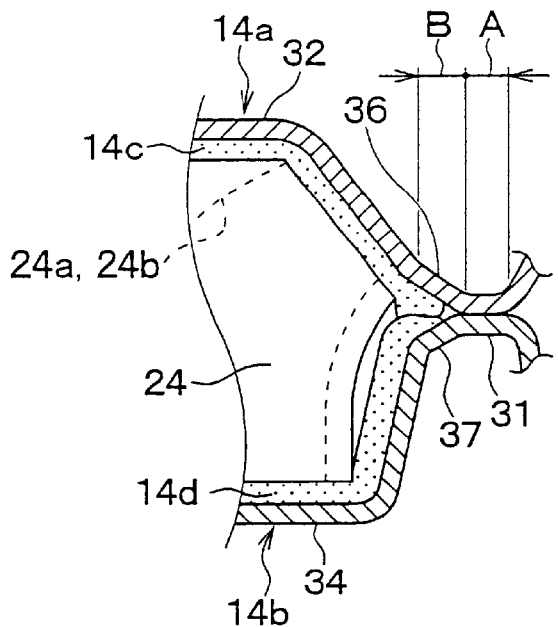
FIG. 5B is a cross-sectional view of a joining portion and a seal portion of the upper and lower beam members in the first embodiment.

FIGS. 5A and 5B show the completed state of mounting of the upper and lower beam members 14a, 14b. The duct bodies 14c, 14d are not positioned in the parts of the flat joining surfaces 30, 31 formed in the end surfaces of the upper and lower semi-tubular portions 32, 34, and the metal surfaces of the upper and lower beam members 14a, 14b are exposed. In the parts of the joining surfaces 30, 31, the metal surfaces can be placed in direct contact with each other.

Accordingly, in the parts of the joining surfaces 30, 31, the upper and lower joining surfaces 30, 31 are firmly joined by joining means such as rivets, bolts, screws (screwing), welding, or the like in the state where the metal surfaces are placed in direct contact with each other.

Inside of the joining surfaces 30, 31, tapered, gradually changing portions 36, 37 for gradually changing the closed sectional shape interior of the beam member 14 are formed over the entire circumference of the joining surfaces 30, 31, as shown in an enlarged scale in FIG. 5B. Therefore, the outer peripheral edges of the upper and lower ducts 14c, 14d are compressed by the tapered, gradually changed portions 36, 37 to exhibit a sealing action between the joining surfaces 30, 31. Contact area A in FIG. 5 shows the contact range area of the joining surfaces 30, 31 of the metal surfaces, and the sealing area B shows the range of sealing by the tapered, gradually changed portions 36, 37.

Figure 6:
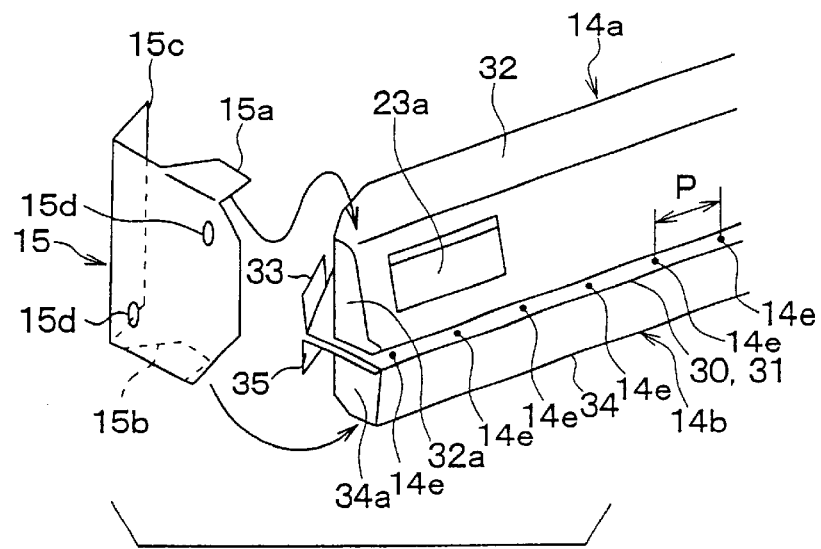
FIG. 6 is a perspective view of a side bracket mounting structure of the first embodiment.

(6) Step of mounting the side brackets 15, 16 made of metal, or other rigid, supporting material FIG. 6 shows the method for mounting the left side bracket 15. Fixing parts 15a, 15b are formed by bending on the upper and lower ends of the side bracket 15. A fixing part 15c extends vertically and is formed by bending the side bracket 15 on its forward end, with respect to the vehicle.

In the present example, the left side bracket 15 is secured to the left end of the beam member 14 by the three fixing parts 15a, 15b, and 15c. That is, the upper and lower fixing parts 15a, 15b are secured to the top outer surfaces of the semi-tubular portions 32, 34 of the upper and lower ducts 14c, 14d by means of fastening means such as bolts, screws, rivets or the like. This is because when joining means using heat, such as welding, is used, the ducts 14c, 14d positioned in the top inner surfaces of the upper and lower semi-tubular portions 32, 34 are subjected to thermal damages or distortions. Therefore, fixing of the upper and lower fixing parts 15a, 15b is accomplished by mechanical fastening means.

On the other hand, since the fixing part 15c on the forward side is secured to the fixing parts 33, 35 of the upper and lower beam members 14a, 14b, that is, parts that do not cause the ducts 14c, 14d to be subjected to thermal damages, mechanical fastening means such as bolts and rivets may be used as fixing means, as well as joining means utilizing heat, such as welding or the like. The left side bracket 16 is provided with exactly the same fixing parts 16a to 16c (FIG. 1), which are secured to the right end of the beam member 14 in the same method, respectively. Fixing places of the side brackets 15, 16 is not limited to the three places described above but may be also two places, or another number of places. The left and right side brackets 15, 16 are provided with mounting holes 15d, 16d for securing them to the vehicle body in two places, respectively.

Forming of the air conditioning duct structure, with respect to beam member 14, is terminated in the above-described procedure. As shown in FIG. 5A, a protective wiring member 29 formed of a soft resin material is easily deformed according to the profile of the duct bodies 14c, 14d. The protective wiring member 29 is inserted into the upper and lower wiring holding portions 26, 27, and vehicle electrical wiring 28 is inserted into the wiring protective member 29 such that the vehicle wiring 28 is covered with the soft wiring protective member 29. The vehicle wiring 28 can be held inside of the wiring holding portions 26, 27.

In FIG. 6, joining portion 14e designates a joining position for a fastener such as rivets, bolts, screws (screwing), and welding, or the like, for joining surfaces 30, 31 of the upper and lower beam members 14a, 14b. Many of the joining portions 14e are provided at a predetermined pitch P.

Next, the operation and effect of the first embodiment will be explained.

(a) As mentioned above, the upper beam 14a and the upper duct 14c, and the lower beam member 14b and the lower duct 14d are respectively laminated and adhered in the state of the sheet materials 141, 142 (developed shape) to integrate them as shown in FIGS. 4A–4C and 5A. This is accomplished before the material 141, for the upper and lower beam members 14a, 14b, is molded into a fixed semi-tubular shape together with the material 142, for the upper and lower ducts 14c, 14d. Therefore, it is not necessary to mold the duct bodies 14c, 14d alone.

That is, as compared with the prior art arrangements in which the air conditioning duct portion is molded in advance, and the molded air conditioning duct portion is inserted into the beam member, the step of molding (blow molding, vacuum molding, or the like) the air conditioning duct alone is unnecessary to considerably reduce the processing cost.

(b) The troublesome mounting step of inserting the molded air conditioning duct into the beam member and locating the opening is also not necessary. At the same time, since the duct bodies 14c, 14d are in close contact with the internal surfaces of the beam members 14a, 14b, the internal space of the beam member 14 is effectively used for securing a ventilation path area of the air conditioning duct, and the quantity (volume) of air conditioning air is increased.

(c) In terms of physical distribution, since the beam members 14a, 14b and the ducts 14c, 14d can be transported in the sheet material shape, the area occupied during time of transport is considerably reduced as compared with the hollow duct shape. This improves the transportation efficiency of the parts.

(d) Since the beam member 14 is constructed by the upper and lower beam members 14a, 14b divided into two along the longitudinal direction (width direction of the vehicle), the closed portions 32a, 32b, 34a, 34b can be molded integrally by drawing the beam members 14a, 14b, relative to both ends, in the longitudinal direction of the semi-tubular portions 32, 34. Accordingly, it is not necessary to mount the cap member for closing the duct ventilation path on either or both ends of the beam member 14.

At this time, the closed portions 32a, 32b, 34a, 34b are made to have a shape which is obliquely inclined in the longitudinal direction (width direction of the vehicle) of the beam member 14 as shown in FIG. 1, whereby conditioned air in the duct ventilation path is guided smoothly toward the side face outlet openings 23a, 23b. That is, the closed portions 32a, 32b, 34a, 34b have the function of concurrently guiding conditioned air.

By dividing the beam member 14 into two, it becomes easy to make a sectional shape peculiar to each of the beam members 14a, 14b, thus increasing a degree of freedom in design.

(e) Since the joining surfaces 30, 31 of the beam members 14a, 14b are constructed by the metal contact surfaces, they can be firmly mechanically joined without being affected by compression deformation of the ducts 14c, 14d. Further, since the joining surfaces 30, 31 are constructed by the contact surface between the metal surfaces, the joining surfaces 30, 31 can also be joined using joining means to which heat is applied such as in welding.

(f) Even if the joining surfaces 30, 31 are constructed by the contact surface between the metal surfaces, the tapered, gradually changed portions 36, 37 are formed adjacent to the joining surfaces 30, 31, and the ducts 14c, 14d are surely compressed. Therefore, it is possible to achieve the sealing action of the joining surfaces 30, 31.

(g) By the simple task of placing the ventilation path partitioning member 24 on the beam member body 14b of the beam members 14a, 14b divided into two, the ventilation path partitioning member 24 can be securely sandwiched and fixed between the beam members 14a, 14b.

Further, the inlet side having a passage sectional shape of the center face passages 24a, 24b of the ventilation path partitioning member 24 is adjusted to the vehicle mounting conditions on the air conditioning unit 13 so that the dimension with respect to the width of the vehicle has a small shape. The outlet side having the passage sectional shape of the center face passages 24a, 24b may be made to have a flat shape (see FIG. 1) in which the dimension with respect to the width of the vehicle is large. Thereby, in the beam member 14, the shape of the center face outlet openings 22a, 22b in communication with the outlet side of the ventilation paths 24a, 24b of the ventilation path partitioning member 24 can also be a flat shape in the longitudinal direction. Accordingly, the sectional shape of the beam member 14 may be made to have a shape which is advantageous in strength (a shape whose secondary moment, or moment of inertia, in section is large).

(h) As shown in FIG. 5A, the vehicular electric wiring 28 is held by the wiring holding portions 26, 27 molded integrally with the upper and lower beam members 14a, 14b. The beam member 14 has the concurrent function of supporting the wiring. Moreover, both ends of the beam member 14 are always in an earth potential (affected by gravity) since they are secured to the vehicle body by the side brackets 15, 16 after being mounted on the vehicle. Accordingly, the circumference of the vehicle electric wiring 28 is surrounded by the wiring holding portions 26, 27 of the beam member 14, whereby the electromagnetic shield effect with respect to the vehicle electric wiring 28 is exhibited.

(Second Embodiment)

In the first embodiment, the closed portions 32a, 32b, 34a, 34b are molded integrally on both ends in the longitudinal direction of the semi-tubular portions 32, 34 of the beam members 14a, 14b, and the side brackets 15, 16, separately from the beam member 14, are joined to both ends of the beam member 14.

Figure 7:
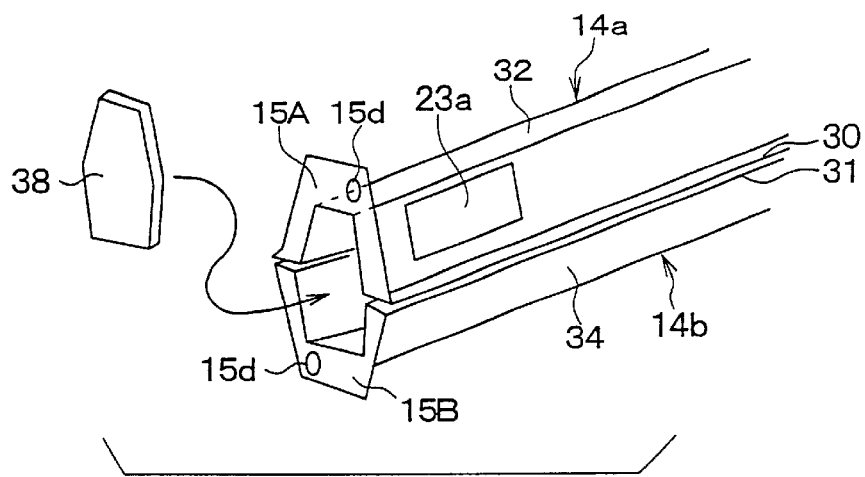
FIG. 7 is a perspective view of an integrally molded beam member body and a side bracket according to a second embodiment.

On the other hand, in the second embodiment, as shown in FIG. 7, bracket bodies 15A, 15B corresponding to the side bracket 15 are integrally constructed with the left ends of the semi-tubular portions 32, 34 of the beam members 14a, 14b divided into two. The bracket bodies 15A, 15B are formed to be spread externally (radially outward) from the ends of the semi-tubular portions 32, 34, and are respectively provided with one mounting hole 15d with respect to the vehicle body.

Openings at left ends of the semi-tubular portions 32, 34 of the beam members 14a, 14b are closed by a separate cap member 38. This cap member 38 is fitted and fixed into the openings at the left ends of the semi-tubular portions 32, 34 after the beam members 14a, 14b have been joined. Since the cap member 38 constitutes part of the duct ventilation path, a resin material is suited, as a material thereof, which is excellent in heat insulating and sound absorbing properties similar to the duct bodies 14c, 14d. However, it is necessary, as a material for the cap member 38, to select one having strength (rigidity) for maintaining the fitting and fixing state.

FIG. 7 shows only the left ends of the beam member bodies 14a, 14b, but also in the right ends of the beam member bodies 14a, 14b, the bracket body corresponding to the side bracket 16 is constructed integrally on the right ends of the semi-tubular portions 32, 34 of the beam member bodies 14a, 14b. The opening at the right end is closed by a separate cap member 38.

The cap member 38 may be put in the opening of the semi-tubular portions 32, 34 before the beam member bodies 14a, 14b are joined, similarly to the ventilation path partitioning member 24.

(Third Embodiment)

In the first embodiment, the material 141 for the beam member bodies 14a, 14b and the material 142 for the duct bodies 14c, 14d are each individually cut into a sheet-like shape and at a predetermined dimension, before the material 141 for the beam member bodies 14a, 14b and the material 142 for the duct bodies 14c, 14d are laminated and adhered.

Figure 8A:
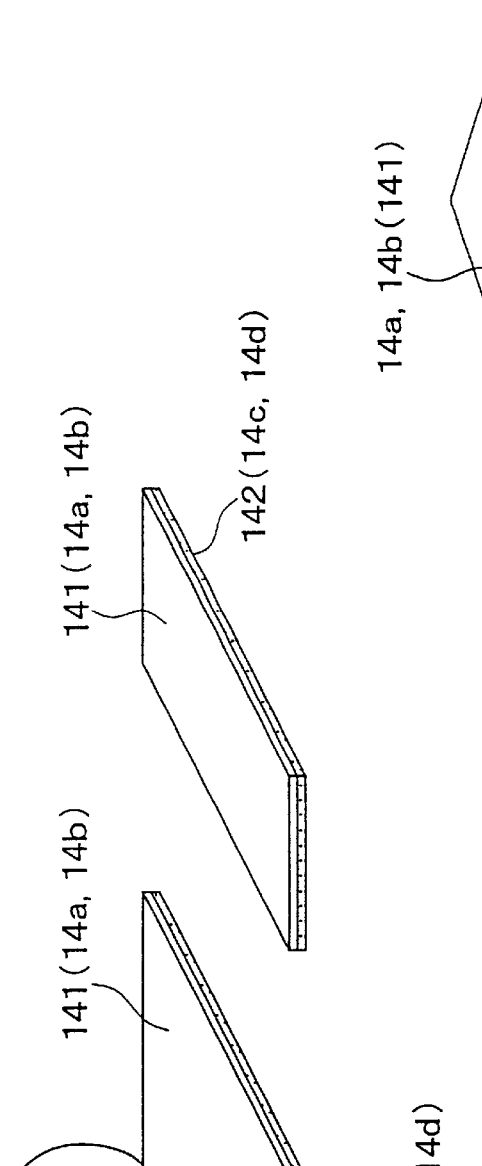
FIG. 8A is a view of a step for molding upper and lower beam members according to a third embodiment.
Figure 8B:
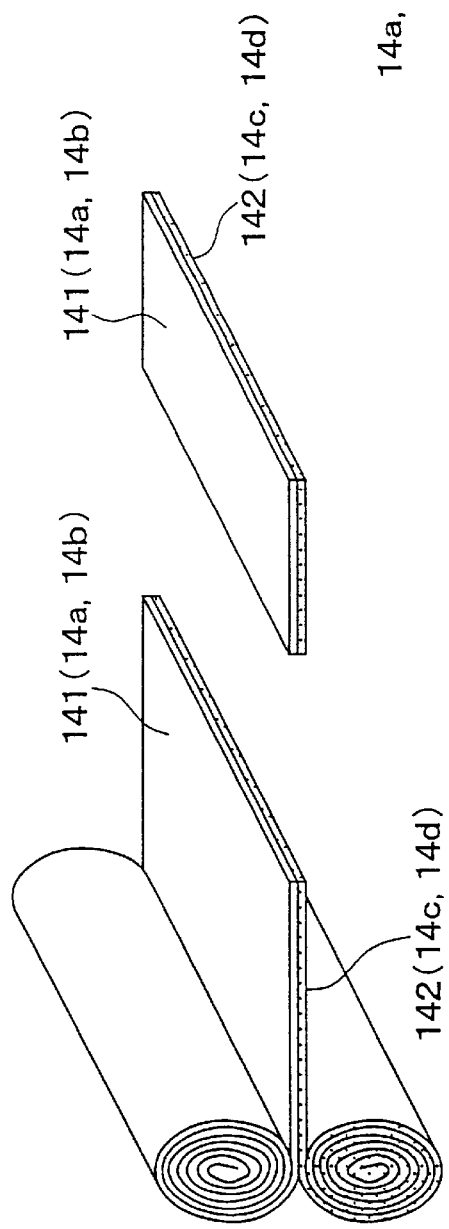
FIG. 8B is a view of a step for molding upper and lower beam members according to a third embodiment.
Figure 8C:
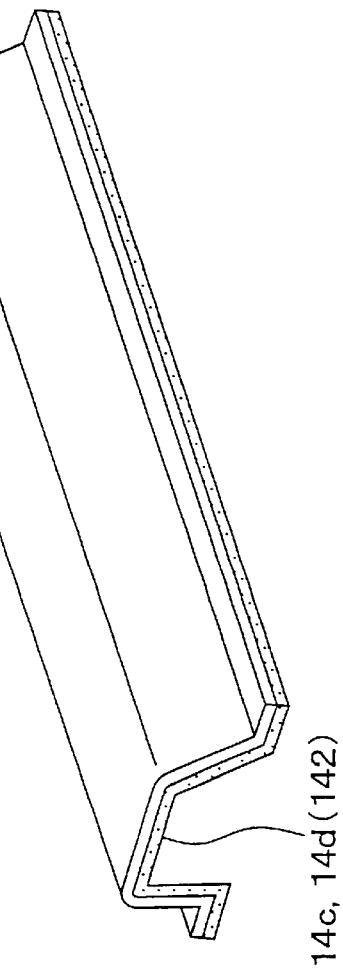
FIG. 8C is a view of a step for molding upper and lower beam members according to a third embodiment.

On the other hand, in the third embodiment, the material 141 for the beam member bodies 14a, 14b and the material 142 for the duct bodies 14c, 14d are integrated in advance by adhesion or the like in the stage of materials. Then, as shown in FIG. 8A, the materials 141, 142 are cut into a predetermined size in the same external shape dimension simultaneously, as shown in FIG. 8B. In the third embodiment, the material 142 for the duct bodies 14c, 14d are fixedly mounted on the inner surface of the material 141 for the beam member bodies 14a, 14b. Thereafter, the material 141 for the beam member bodies 14a, 14b and the material 142 for the duct bodies 14c, 14d are press-molded into a predetermined semi-tubular shape, as shown in FIG. 8C.

According to the third embodiment, the material 141 for the beam member bodies 14a, 14b and the material 142 for the duct bodies 14c, 14d are integrated in advance in the stage of materials, and cutting of the external shape is carried out simultaneously, thus enabling further reduction in processing costs than the first embodiment. Then, both materials 141, 142 are cut into the same external shape dimension. The portions to be the wiring protective members 29A, 29B can be integrally molded with the duct bodies 14c, 14d, as shown in FIG. 9.

Figure 9:
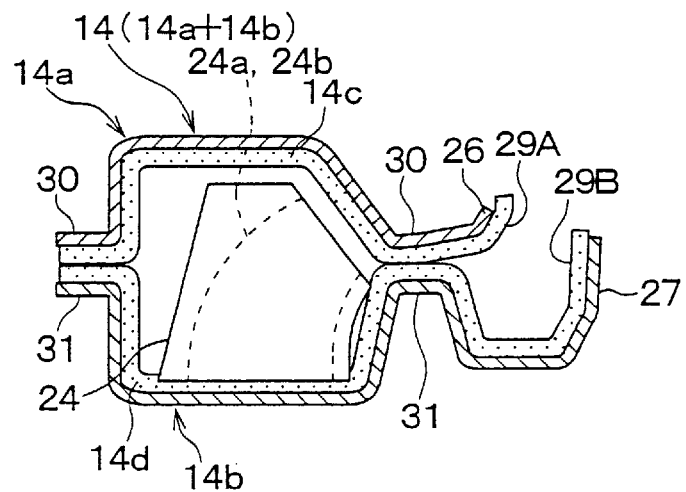
FIG. 9 is a cross-sectional view of a joining portion and a seal portion of the upper and lower beam members in the third embodiment.

However, according to the third embodiment, as shown in FIG. 9, the duct bodies 14c, 14d are interposed between the joining surfaces 30, 31, and the duct bodies 14c, 14d are compressed by the joining surfaces 30, 31 to obtain the desired sealing performance. Accordingly, as the joining means for the joining surfaces 30, 31, mechanical fastening means such as rivets or bolts are preferred in order to avoid the thermal influence on the duct bodies 14c, 14d.

Since mechanical fastening for the joining surfaces 30, 31 is carried out in the state that the duct bodies 14c, 14d are interposed between the joining surfaces 30, 31, it is best to avoid lowering the mechanical fastening strength used to join surfaces 30, 31 and to maximize sealing performance. This is accomplished by selecting a material having characteristics in which the work for mechanically fastening the duct bodies 14c, 14d easily compresses (crushes) to a value in the vicinity of the minimum permissible thickness of the duct bodies 14c, 14d.

(Fourth Embodiment)

In the first to third embodiments, any of the upper and lower beam member bodies 14a, 14b are bend-processed into a sectional shape having semi-tubular portions 32, 34 to join the semi-tubular end surfaces of the upper and lower beam member bodies 14a, 14b. However, in the fourth embodiment, as shown in FIG. 10, only the upper beam member body 14a is bend-processed into a sectional shape having the semi-tubular portion 32, whereas the basic shape of the lower beam member body 14b is formed into an essentially flat, planer shape extending in the longitudinal direction of the beam member 14.

Thereby, in the fourth embodiment, the end surface of the planer peripheral edge portion of the lower beam member body 14b is placed in contact with the semi-tubular end surface of the upper beam member body 14a to join the end surface of the upper beam member body 14a with the end surface of the lower beam member body 14b. As described above, even if the shape of the upper and lower beam member bodies changes, an effect similar to that of the first to third embodiments is achieved.

In the fourth embodiment, the side brackets 15, 16 are mounted on the ends of the beam member bodies 14a, 14b, respectively, by means of screwing or the like after both upper and lower beam member bodies 14a, 14b have been joined. The side brackets 15, 16 are used to close the openings at both ends of the beam member bodies 14a, 14b and to mount both ends of the beam member 14 on the side wall portions of the vehicle body.

Figure 10:
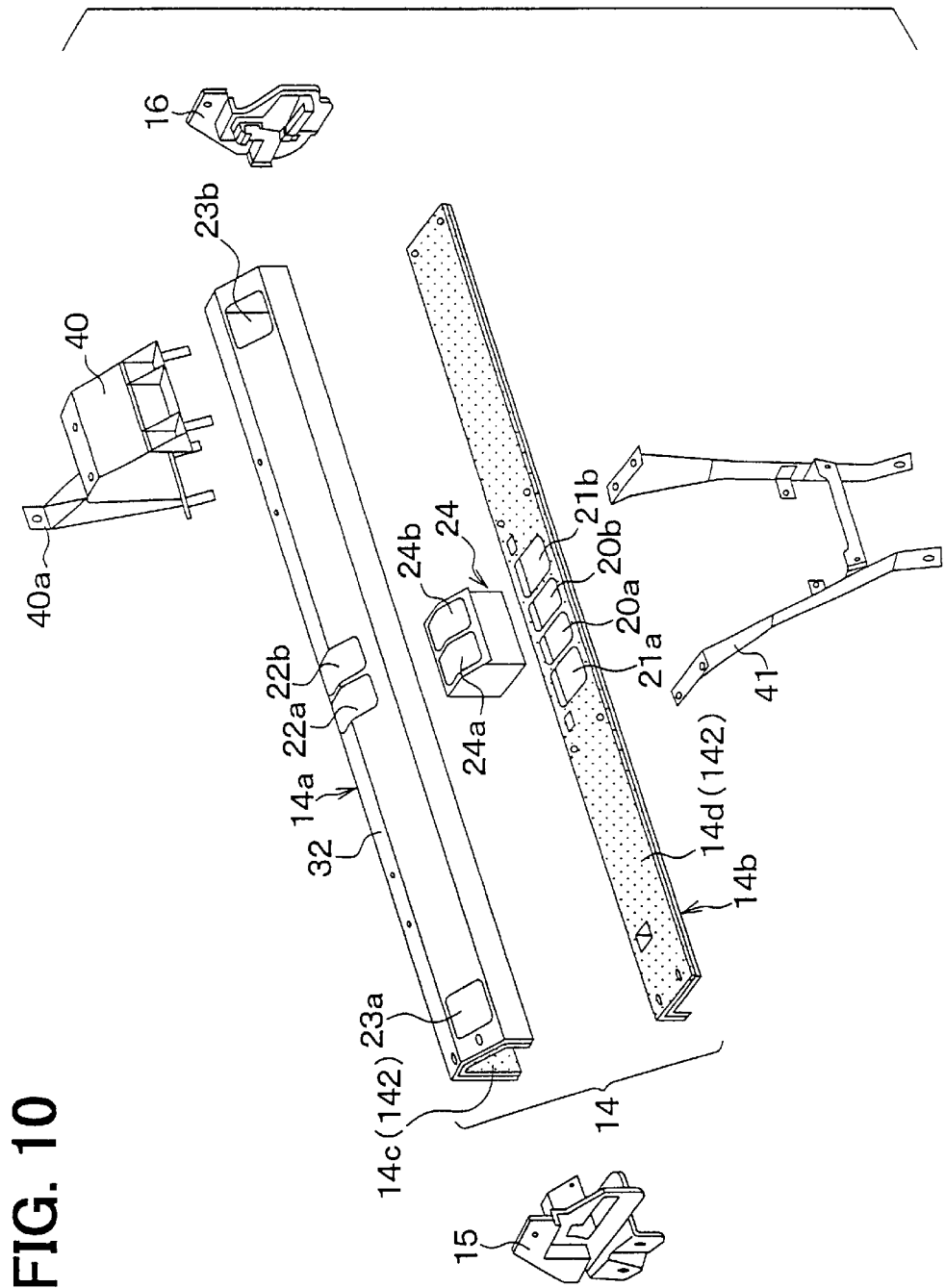
FIG. 10 is an exploded perspective view of a vehicular air conditioning duct structure according to a fourth embodiment.

In FIG. 10, a stay 40 is used for supporting a steering system, which is mounted on part on the driver's seat side (rightward part in FIG. 10) in the upper beam member body 14a by screwing or the like. In the stay 40 for supporting a steering system, a bracket portion 40a for securing the vehicle body to a fire wall (not shown) is formed integrally forward of the vehicle. Here, the fire wall is a partition wall for partitioning between the passenger compartment and the engine room.

Further, a center brace 41 (column member), and the upper end of the center brace 41 is mounted at approximately a central portion of the lower beam member body 14b by screwing or the like. The lower end of the center brace 41 is secured to the floor portion of the vehicle body by fastening means <such as bolts, screws, welding, or the like, and the central portion of the beam member 14 is supported on the floor portion of the vehicle body.

(Fifth Embodiment)

In any of the first to fourth embodiments, the sheet material 141 for the beam member bodies 14a, 14b and the sheet material 142 for the duct bodies 14c, 14d are laminated and adhered. However, in the fifth embodiment, as shown in FIG. 11, the sheet-like duct material 142 is not adhered to the sheet-like beam member material 141, but the duct bodies 14c, 14d are molded into a predetermined shape in advance, and the pre-molded duct bodies 14c, 14d are incorporated into the beam member bodies 14a, 14b.

Figure 11:
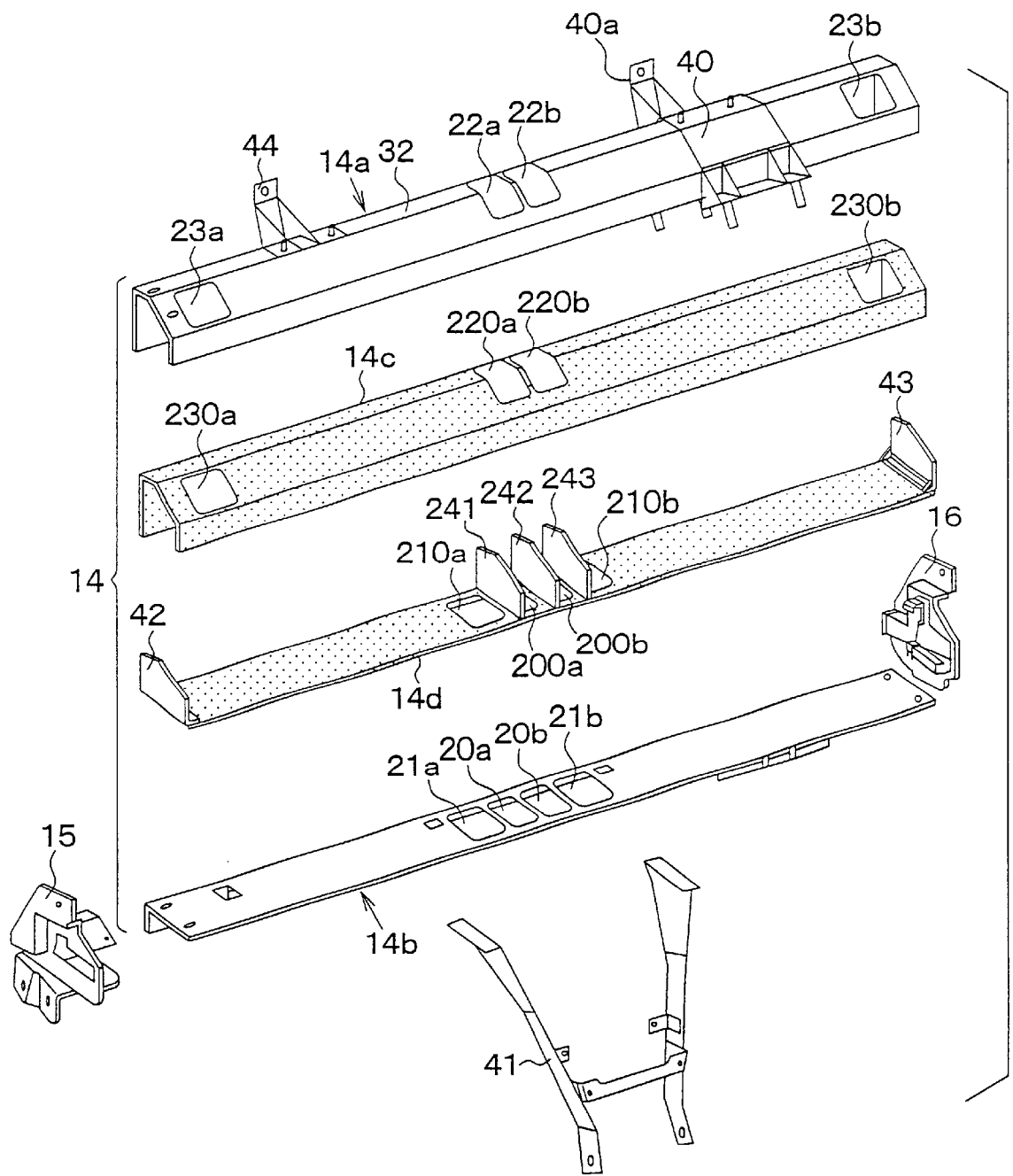
FIG. 11 is an exploded perspective view of a vehicular air conditioning duct structure according to a fifth embodiment.

In FIG. 11, parts equal to those of the first to fourth embodiments are indicated by the same reference numerals, descriptions of which is omitted. The duct bodies 14c, 14d divided into upper and lower pieces, respectively, are individually molded into a predetermined shape as mentioned above. More specifically, the upper duct body 14c is molded by a heat insulating, sound absorbing material so as to have a semi-tubular sectional shape. The molding of the upper duct body 14c can be carried out by a powder molding method for molding a powdery resin material within a metal mold, or a vacuum molding method for heating and softening a sheet-like resin material on the metal mold and adsorbing it on the metal mold surface by vacuum-drawing and molding. It is noted that openings 220a, 220b for the center face and openings 230a, 230b for the side face are opened to the upper duct body 14c simultaneously with molding or after molding.

On the other hand, the basic shape of the lower duct body 14d is molded into an essentially flat plate shape extending in the longitudinal direction of the beam member 14, and four openings, that is, openings 200a, 200b for the center face, and openings 210a, 210b for the side face are opened to the central portion in the longitudinal direction. In the lower duct body 14d, ventilation path partitioning plates 241, 242, and 243 are integrally molded so as to project toward the upper duct body 14c between the four openings 200a, 200b, 210a, 210b. The ventilation path partitioning plates 241, 242, 243 play a role corresponding to the box-like ventilation partitioning member 24 in the first to fourth embodiments.

In both ends of the lower duct body 14d, the closed portions 42, 43 for closing the end openings of the upper duct body 14c are molded integrally so as to project toward the upper duct body 14c in the shape of a plate, such as a flat plate. Molding of the lower duct body 14d is accomplished by the powder molding method or the vacuum molding method described above.

The upper and lower beam member bodies 14a, 14b in the fifth embodiment are in the same form as the fourth embodiment. That is, only the upper beam member body 14a is bend-processed into a sectional shape having the semi-tubular portion 32, whereas the basic shape of the lower beam member body 14b is formed into an essentially flat shape extending in the longitudinal direction of the beam member 14.

In the fifth embodiment, the upper duct body 14c is incorporated into the semi-tubular shape inside of the upper beam member body 14a, and the lower duct body 14d is incorporated into the inside surface of the lower beam member body 14b. Thereafter, the end surfaces of the peripheral edges of the upper and lower beam member bodies 14a, 14b are combined so that they face each other, and both end surfaces are joined together by joining means such as rivets, bolts (screwing), welding or the like. The side brackets 15, 16 are mounted on respective ends of the upper and lower beam member bodies 14a, 14b by means of bolts (screwing) or the like after the upper and lower beam member bodies 14a, 14b have been joined. In FIG. 11, reference numeral 44 designates a fixing bracket for fixing the vehicle body to the fire wall, which is mounted on the upper beam member body 14a.

In the fifth embodiment, the upper duct body 14c and lower duct body 14d are individually molded into a predetermined shape. The members 40, 41, 44 for mounting to the vehicle body are joined efficiently by welding on the upper and lower beam member bodies 14a, 14b without thermal damage to the duct material before the duct bodies 14c, 14d are incorporated.

(Sixth Embodiment)

Figure 12:
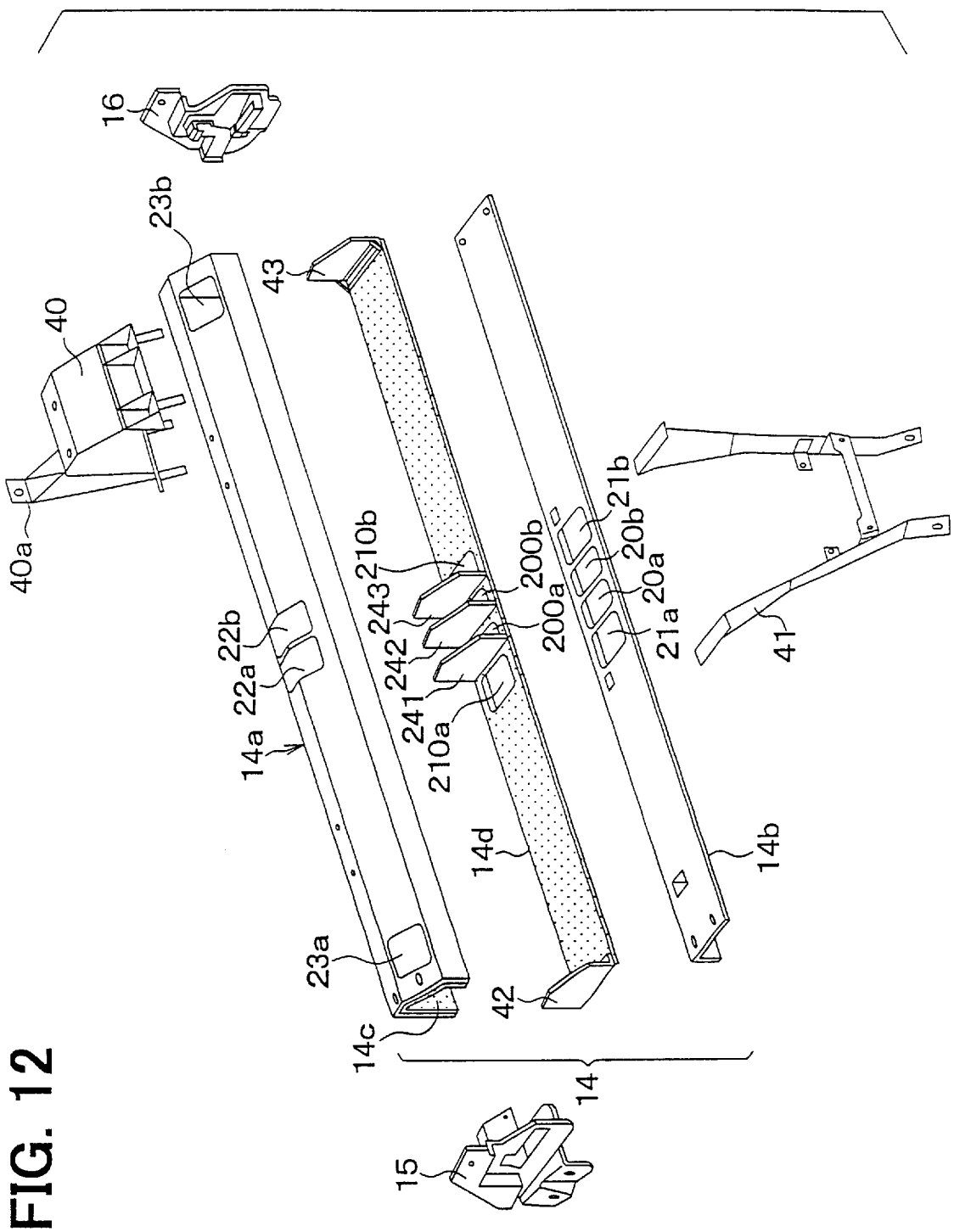
FIG. 12 is an exploded perspective view of a vehicular air conditioning duct structure according to a sixth embodiment.

FIG. 12 shows a sixth embodiment, which is a compromise proposal between the fourth embodiment shown in FIG. 10 and the fifth embodiment shown in FIG. 11. That is, in the upper beam member body 14a, the sheet-like duct material 142 is laminated and adhered to the sheet-like beam member material 141, and the sheet-like beam member stock 141 is bend-processed into a semi-tubular shape. Accordingly, the upper duct body 14c is integrated by adhesion on the upper beam member body 14a similar to the fourth embodiment shown in FIG. 10.

On the other hand, the lower duct body 14d is molded into a predetermined shape in advance similar to the fifth embodiment shown in FIG. 11, and the molded lower duct body 14d is incorporated onto the inner surface of the lower beam member body 14b, before the end surfaces of the upper and lower beam member bodies 14a, 14b are integrally joined.

(Specific Study of a Pitch of Joining Portions)

Figure 13:
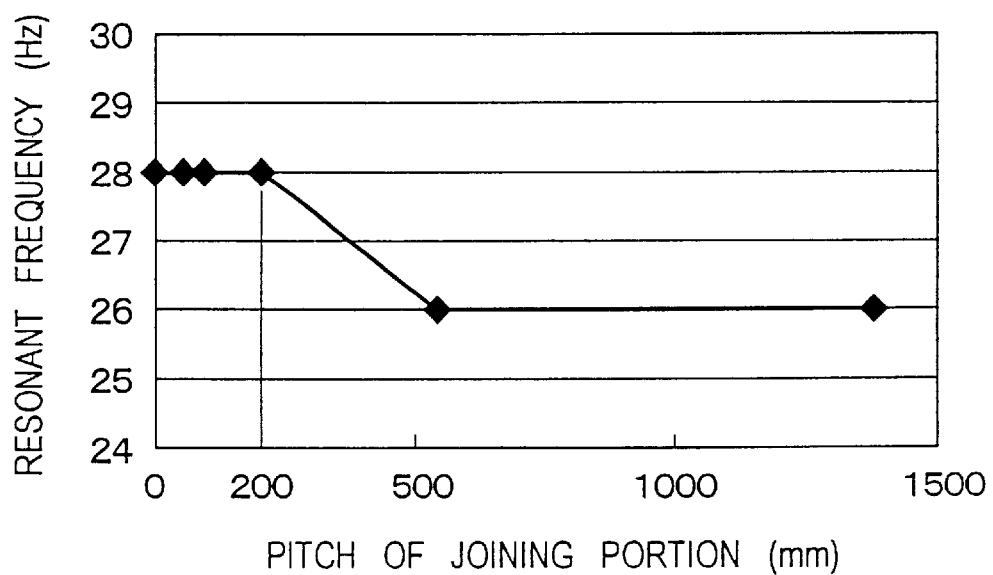
FIG. 13 is a graph showing relationships between pitch of a joining portion between ends of upper and lower beam members and a resonant frequency of the beam members.

The present inventor has experimented and studied in detail the pitch P of the joining portion 14e (FIG. 6) for joining the end surfaces of the upper and lower beam member bodies 14a, 14b, from which the result shown in FIG. 13 was obtained. The abscissa (X-axis) denotes the pitch P of the joining portion 14e in FIG. 6. The ordinate (Y-axis) denotes the resonant frequency of the beam member 14 in the state of being mounted on the vehicle. It was found that when the pitch P is set to a value not more than 200 mm, the rigidity of the beam member 14 increased to make the resonant frequency higher. Accordingly, the pitch P is set to a value not more than 200 mm whereby vibrations caused by the resonant phenomenon of the beam member 14, when mounted on the vehicle, are suppressed.

(Other Embodiments)

In the first to fourth embodiments and the sixth embodiment (only the upper beam member body 14a), a flowing state (liquid-like, sol-like, or gel-like) material such as a foam material may be used as a material for the duct without using the sheet material 142 for the duct. The fluid material for the duct is firmly mounted on one surface of the sheet material 141 of the beam member bodies 14a, 14b by blow coating, and then the material 141 for the beam member bodies 14a, 14b is cut into the necessary size and formed into a semi-tubular shape or the like.

When the fluid material for the duct is blow coated on one surface of the material 141 of the beam member bodies 14a, 14b as described above, the material for the duct can be easily blow coated on only the necessary range in the surfaces of the beam member bodies 14a, 14b using a masking procedure.

With respect to the foaming of a foam material, either of the methods may be employed: a method for blowing a raw material not foamed on the surface of the material 141 for the beam members in the flowing state and afterward carrying out a post-treatment suitable of foaming; or a method for blowing a foamed material in the flowing state on the surface of the material 141 for the beam members. The upper and lower beam member bodies 14a, 14b may be formed into a predetermined shape before the fluid material for the duct is blown directly on the inner surfaces of the upper and lower beam member bodies 14a, 14b to form the upper and lower duct bodies 14c, 14d.

According to the aforementioned modifications, with respect to the material for the duct 142, since no waste of material caused by drawing of external shape occurs the yield of material is improved.

In the first embodiment, a description has been made of the case where mounting of the ventilation path partitioning member 24 is carried out before joining of the beam member bodies 14a, 14b. However, the ventilation path partitioning member 24 may be mounted in the beam member 14 through the openings 22a, 22b of the beam member 14, after joining of the beam member bodies 14a, 14b.

Further, the present invention may be applied to the constitution in which the wiring holding portions 26, 27 are integrally molded with the beam member 14.

(Seventh Embodiment)

Figure 14:
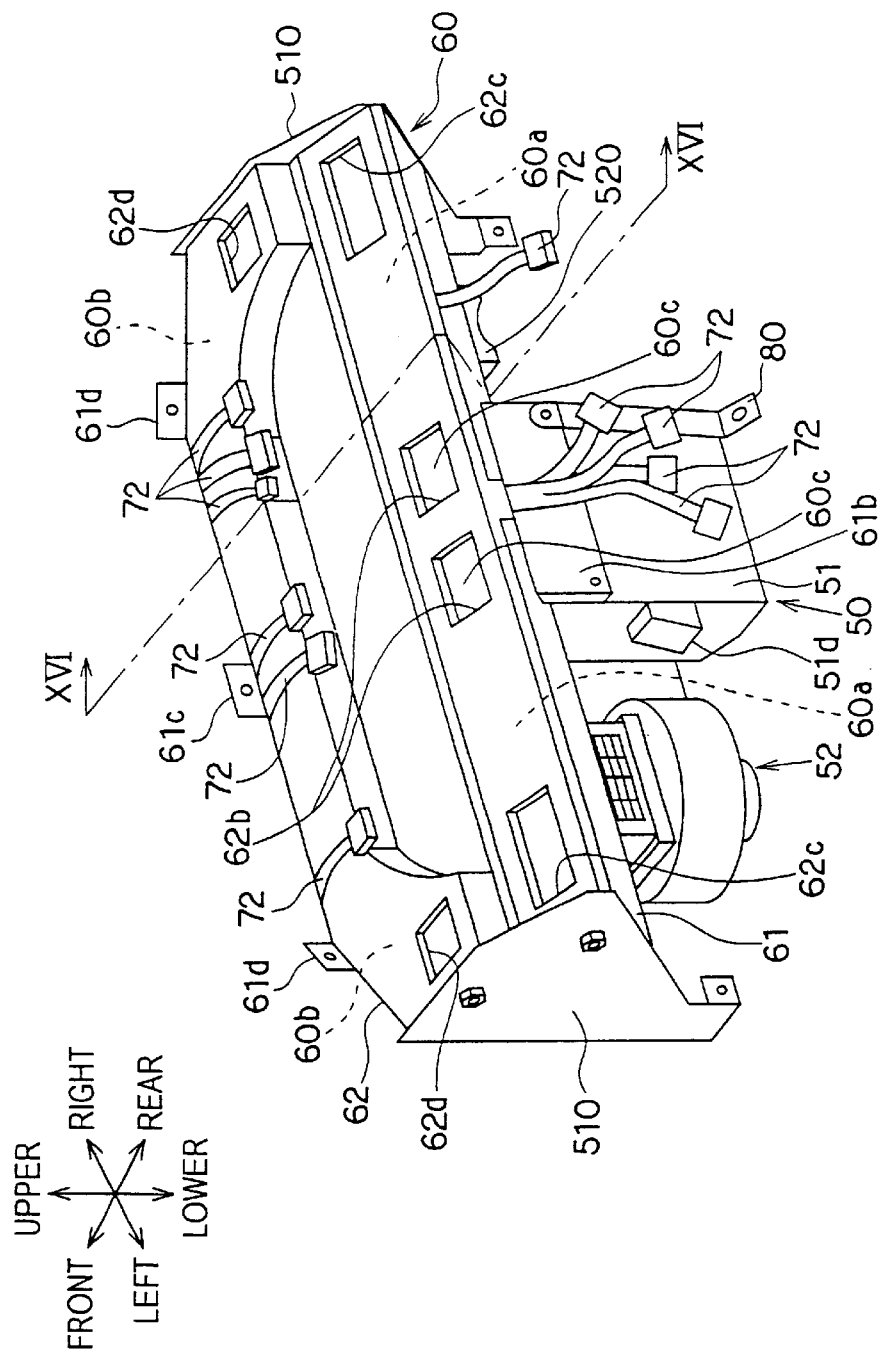
FIG. 14 is a perspective view of the air conditioning duct structure according to a seventh embodiment of the present invention.
Figure 15:
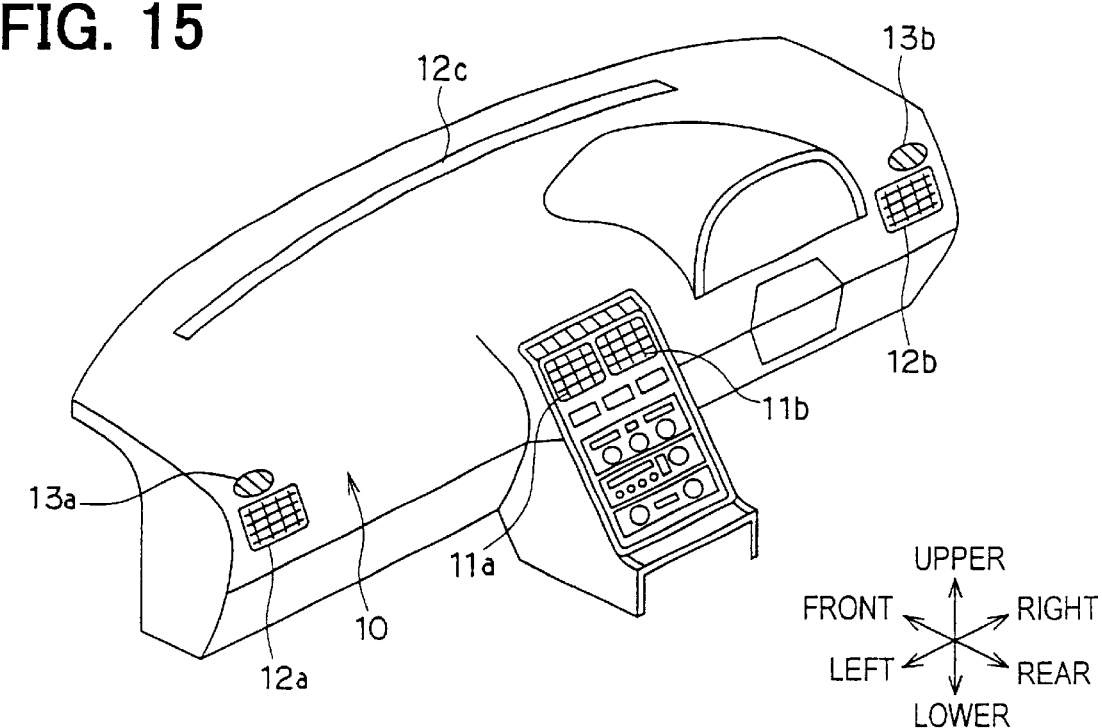
FIG. 15 is a perspective view of an instrument board according to the sixth embodiment.

FIG. 14 shows an air conditioning duct structure according to a seventh embodiment. The air conditioning duct structure shown in FIG. 14 is mounted internally of an instrument board such as the one shown in FIG. 15. Here, the arrows in FIGS. 14 and 15 show the general directions of left/right, upper/lower, and front/rear which indicate the general locations of parts in the vehicle when they are in their mounted positions.

The instrument board 10 is positioned at the front of the vehicle within the passenger compartment to have instruments, audio apparatuses and the like mounted within and thereon. Center face blow ports 11a and 11b and side face blow ports 12a and 12b from which air-conditioning air is blown out toward the upper half of the body of a front or rear seat vehicle occupant. The center face blow ports 11a and 11b and side face blow ports 12a and 12b are arranged approximately in the central portion with respect to the width of the vehicle. Side defroster blow port openings 13a and 13b from which air-conditioning air is blown out toward the inside of the side window glass of the vehicle are arranged in opposite ends, with respect to the width of the vehicle, in the instrument board 10. A defroster blow port opening 12c from which air-conditioning air is blown out toward the inside of the forward window glass (windshield) of the vehicle is arranged on the forward side portion of the upper surface of the instrument board 10.

An air conditioning unit 50 (FIG. 14) constituting an indoor unit part of a vehicular air conditioner is arranged internally of the instrument board 10. The air conditioning unit 50 is positioned approximately in the central portion, with respect to the width of the vehicle, and is used to adjust the temperature and humidity of air blown out into the passenger compartment. Therefore, the air conditioning unit 50 has an air conditioner casing 51 which forms an air passage, and apparatuses such as a heat exchanger for cooling (vaporizing), a heat exchange for heating (a hot water type heater core), and the like, are encased in the air conditioner casing 51.

Figure 17:
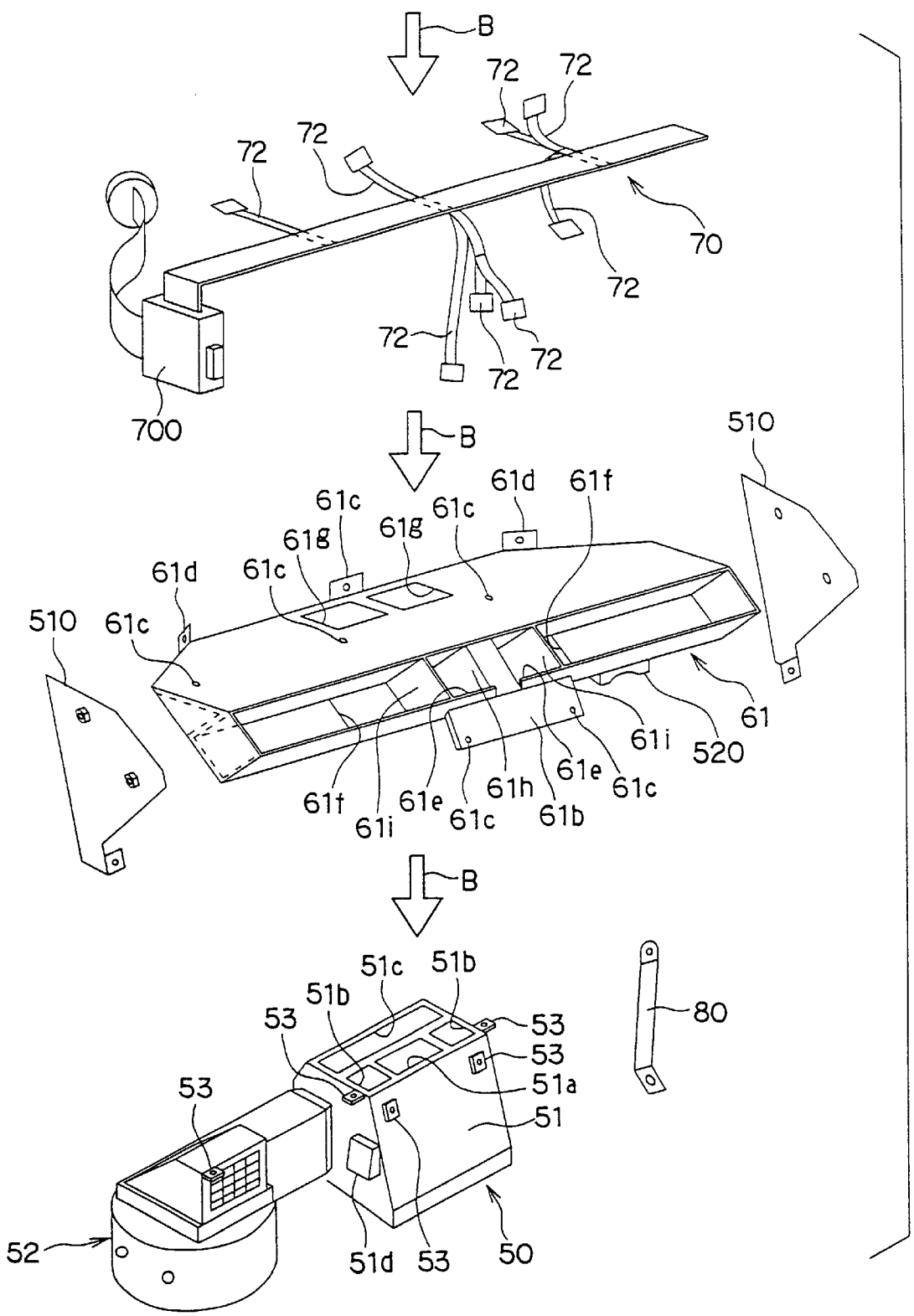
FIG. 17 is an exploded perspective view of the air conditioning duct structure shown in FIG. 14.

A center face opening 51*a* in communication with the center face blow port openings 11*a* and 11*b* are formed on the vehicle's rear side on the upper surface of the air conditioner casing 51 and approximately in the central portion, with respect to the vehicle's width (see FIG. 17). Further, side face openings 51*b*, in communication with the side face blow port openings 12*a* and 12*b*, are formed on opposite sides, with respect to the vehicle's width, of the center face opening 51*a* (FIG. 17). A defroster opening 51*c* in communication with the side defroster blow port openings 13*a* and 13*b* and the defroster blow port opening 12*c* is formed forward of the center face opening 51*a* and the side face opening 51*b* (see FIG. 17). A foot blow port opening 51*d* from which air condition air is blown out toward an occupant's feet is formed in the vehicle's backward or rear side portion of the air conditioner casing 51 on both sides of the air conditioner casing 51. On the side of the seat next to the driver with respect to the air conditioning unit 50 is arranged a blowing unit 52 that switches to introduce inside air or outside air and blow it toward the air conditioning unit 50.

Internally of the instrument board 10, and upwardly of the air conditioning unit 50 is arranged an air conditioning duct 60 which forms a side face passage 60*a* and a side defroster passage 60*b* extending horizontally across the width of the vehicle, and a center face passage 60*c* extending vertically. The side face passage 60*a* is the air passage for allowing air-conditioning air from the side face opening 51 opened to the air conditioner casing 51 to flow toward the side face blow port openings 12*a* and 12*b*. The side defroster passage 60*b* is the air passage for allowing air-conditioning air from the defroster opening 51*c* opened to the air conditioner casing 51 to flow across the width of the vehicle toward the side defroster blow port opening 13*a* and 13*b*. Further, the center face passage 60*c* is the air passage for allowing air-conditioning air from the center face opening 51*a* opened to the air conditioner casing 51 to flow in the vehicle lateral direction toward the center face blow port opening 11*a* and 11*b*.

Figure 16:
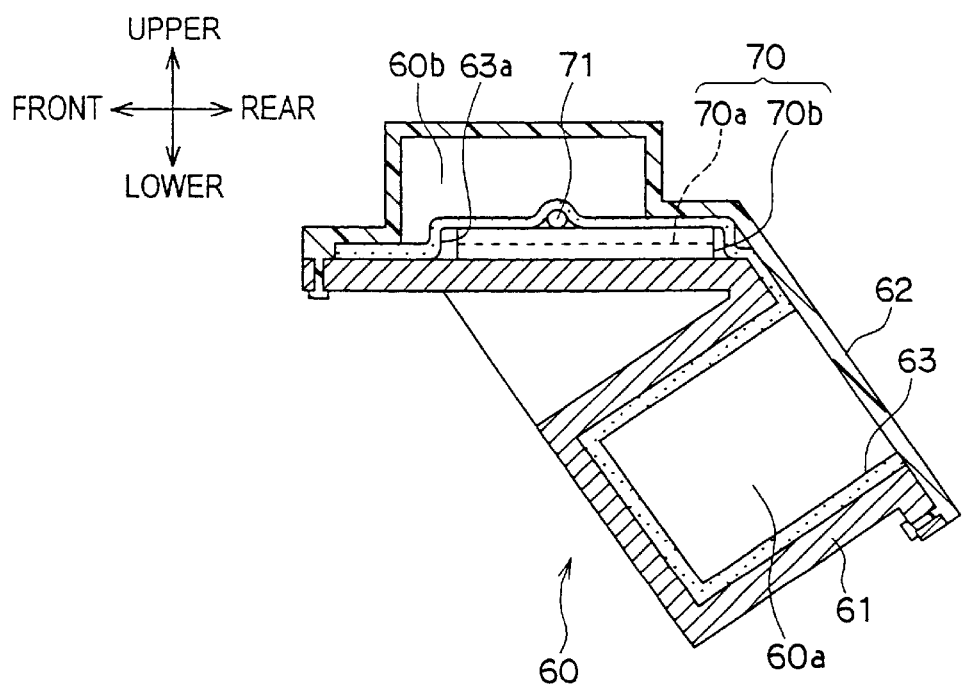
FIG. 16 is a cross-sectional view taken along line XVI—XVI of FIG. 14.

FIG. 16 is a sectional view of a part taken along the dotted line 16—16 of FIG. 14. In FIG. 16, the air conditioning duct 60 is designed so that a first division member 61 and a second division member 62, which are divided in the direction perpendicular to the vehicle width direction (in this embodiment, the vertical direction), are joined to form the aforementioned side face passage 60*a* and the side defroster passage 60*b*. The side face passage 60*a* and the side defroster passage 60*b* are connected to the side face blow port opening 12*a* and 12*b* and the side defroster blow port openings 13*a* and 13*b*, respectively, by a connecting duct (not shown).

First and second division members 61 and 62 are present. The first division member 61 is positioned below the second division member 62. The first division member 61 (also a reinforcement bar) is made of metal (for example, such as magnesium, aluminum, iron, etc.). The reinforcement bar 61 is formed to have strength for its reinforcing function of reinforcing the vehicle body transversely and its supporting function for supporting the steering of the vehicle. Additionally, the structure 60 serves as part of the air conditioning duct side face passage 60*a*. On the other hand, the division member positioned above first division member 61 is the second division member 62, also serving as a resin cover 62.

Accordingly, the first division member 61 whose section is perpendicular to the vehicle's width, is potentially an open section, but is closed by the resin cover 62 to close off the open section. The first division member 61 is generally thin with regard to wall-thickness to be lightweight. Further, in this embodiment, in order that the cover 62 may reinforce the strength of the first division member 61, material (for example, glass-contained polypropylene) of the cover 62 is selected to reduce the weight resulting from the thinner wall-thickness of the first division member 61.

Side brackets 510 are mounted on both left and right ends of the first division member 61 in the embodiment by welding or the like, and the first division member 61 is secured to the vehicle body (not shown) by fastening the side brackets 510 using bolts or the like. Further, a support member (steering support) 520 for steering shaft is mounted on the lower surface of the first division member 61 by welding or the like. Generally, figures corresponding to a right-hand-drive vehicle is shown, although similar components could be configured for a left-hand-drive vehicle.

The side face passage 60*a* and the side defroster passage 60*b* are formed to have a rectangular cross-sectional shape. In the air conditioning duct 60, three surfaces below the side face passage 60*a* and one surface below the side defroster passage 60*b* are formed by the first division member 61. One surface above the side defroster passage 60*b*, one surface below the side face passage 60*a* and three surfaces above the side defroster passage 60*b* are formed by the cover 62. That is, in the first division member 61, the portion forming the side face passage 60*a* and the portion forming the side defroster passage 60*b*, are U-shaped in cross-section. Further, the first division member 61 and the cover 62 form an enclosure in which both left and right ends of the portion having the U-shape is closed (see FIG. 17).

A sheet-like sheet member 63 is arranged over the entire surface of the first division member 61 the sheet-like member 63 is the inner surface of the air conditioning duct 60. The sheet member 63 has an air layer, and is molded of a sound absorbing and heat insulating material rich in flexibility. In this embodiment, it is molded of a foaming resin (for example, polypropylene, urethane, etc.). This gives the sheet member 63 the ability and function of absorbing noises propagated within the side face passage 60*a* and the side defroster passage 60*b*, and the function of heat-insulating air within the side face passage 60*a* and the side defroster passage 60*b*. Further, the greater the thickness of the sheet member 63, the greater the effect of the aforementioned functions. However, in this embodiment, the thickness of the sheet member 63 is set to 3 mm in order to sufficiently secure the heat insulating function.

In the sheet member 63, a portion positioned in the side defroster passage 60*b* has a groove portion 63*a* extending along the vehicle's width, and in the groove portion 63*a* is arranged a wiring harness (electric wiring) 70 for carrying out electric signal communications between electric apparatuses mounted on the vehicle. The wiring harness 70 is sandwiched between the groove portion 63*a* of the sheet member 63 and the first division member 61 and it is secured onto the inner surface of the first division member 61. The wiring harness 70 employed in this embodiment is generally in a flat form called a flat cable, and the space in which the wiring harness 70 is mounted is made to be a thin plane to save space. The flat cable is configured so that the multiple flat-section conductor portions 70a made of metal conductors are disposed in parallel, and the many conducting portions 70a are coated with electric insulating coating layers 70b formed of a resin material that is flexible to hold them integrally together.

In the portion forming the groove portion of the sheet member 63, a plurality of optical cables 71 for communicating light signals between the electric apparatuses, mounted on the vehicle separately from the wiring harness 70, are molded integrally by the sheet member 63 and resin. More specifically, in resin-molding the sheet member 63, the foaming resin is subjected to vacuum molding in a metal mold in which the optical cable is arranged in a fixed position in advance. This arrangement permits the optical cable 71 to be molded simultaneously with the sheet member 63. It is of course possible that an electric communication line, an antenna cable, or the like, other than the optical cable 71 may be molded simultaneously.

Figure 18:
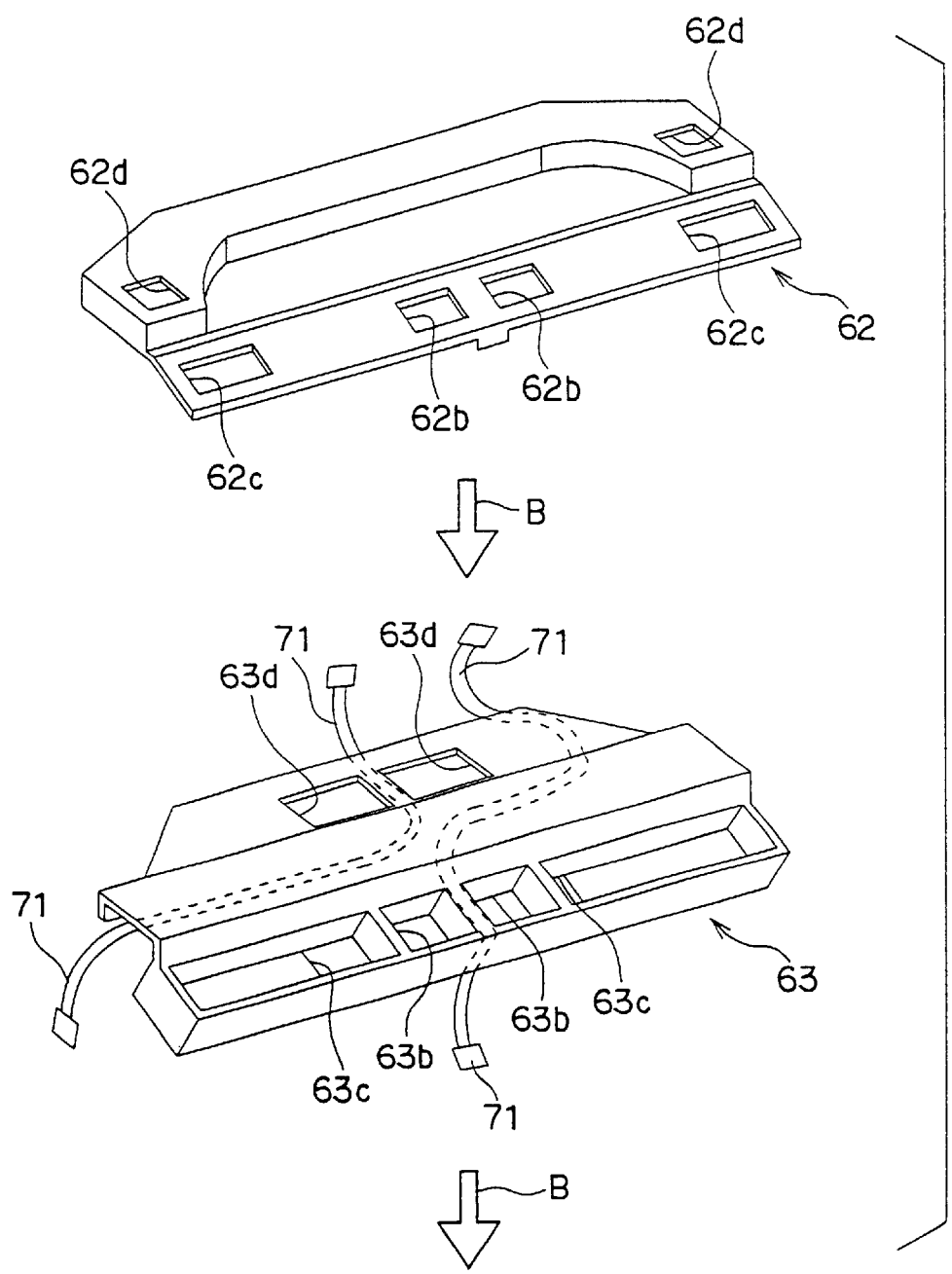
FIG. 18 is an exploded perspective view of the air conditioning duct structure shown in FIG. 14.

FIGS. 17 and 18 are exploded perspective views of FIG. 14. FIG. 17 shows the air conditioning unit 50, the blowing unit 52, the first division member 61 and the wiring harness 70. FIG. 18 shows the sheet member 63 and the cover 62 which mate according to the arrows B in the figures. As shown in FIGS. 17 and 18, the air conditioning duct structure in this embodiment is configured so that the air conditioning unit 50 and the blowing unit 52, the first division member 61, the wiring harness 70, the sheet member 63, and the cover 62 may be assembled in one ordered direction from bottom to top. In the following, the specific assembling structure and procedure will be explained.

First, the first division member 61 is placed at a predetermined position of the upper surfaces of the air conditioning unit 50 and the blowing unit 52. Then, the center face opening 51a, the side face opening 51b and the defroster opening 51c of the air conditioner casing 51 are brought into communication with respective openings 61e, 61f and 61g formed in the first division member 61.

In the first division member 61, the portion forming the side face passage 60a has a partitioning wall 61h for partitioning two openings 61e in communication with the center face opening 51a to the left and the right, and a partitioning wall 61i for partitioning an opening 61f in communication with the opening 61e and the side face opening 51b. The center face opening 60c is formed by being partitioned from the side face passage 60a by the partitioning walls 61h and 61i.

A downwardly extending fixed portion 61b is molded integrally on the rearward side of the first division member 61, and the fixed portion 61b and the air conditioner casing 51 are fastened by a fastening means. In this embodiment, a screw is inserted into a tapped hole 61c formed in the fixed portion 61b to secure the first division member 61 to the air conditioner casing 51. The fixed portion 61b is molded integrally with the first division member 61 whereby the number of parts can be reduced without brackets as separate parts.

The member indicated by the reference numeral 80 in FIGS. 14 and 17 is a press member made of metal which supports a steering structure. The press member 80 is fastened to the fixed portion 61b together with the air conditioning unit 50. Thereby, the fastening member can be reduced. In the first division member 61, the face-like portion forming the side defroster passage 60b has tapped holes 61c in multiple locations, and screws inserted into the tapped holes 31c are mounted on a mounting portion 53 formed integrally with the upper surface of the air conditioner casing 51 to fasten the air conditioning unit 50 and the first division member 61 together.

Next, the wiring harness 70 connected to an electric distribution box (a junction box) 700 in advance is placed at the fixed portion on the upper surface of the first division member 61. The electric distribution box 700 is arranged beside the first division member 61 to distribute an electrical signal or to distribute power between an electric circuit portion within the engine room and an electric circuit portion in the passenger compartment, and between an electric circuit portion of the instrument board 10 in the passenger compartment and an electric circuit portion on the vehicle body side in the passenger compartment, and an electric circuit portion on the rear seat side in the passenger compartment. The electric distribution box 700 is fastened to the side of the first division member 61 or the side bracket 510 by the fastening member and held. Further, the reference numeral 72 in FIG. 17 denotes electric wiring branched in the lateral direction of the vehicle with the basic wiring extending across the vehicle's width, which is connected to various apparatuses (for example, various ECUsg, 20 such as an air conditioner ECU, steering ECU, etc.) to carry out multi-communications.

Next, the sheet member 63 is placed over the wiring harness 70, and the sheet member 63 is placed at the predetermined position on the upper surface of the first division member 61 so that the wiring harness 70 is positioned in the groove portion 63a. The openings 61e, 61f and 61g of the first division member 61 are brought into communication with the openings 63b, 63c and 63d, respectively, formed in the sheet member 63.

Next, the cover 62 is placed at the predetermined position on the upper surface of the sheet member 63. At this time, the end of the sheet member 63 at the vehicle forward side, and the portion positioned between the side face passage 60a and the side defroster passage 60b are placed between the first division member 61 and the cover 62, as shown in FIG. 16.

Figure 19A:
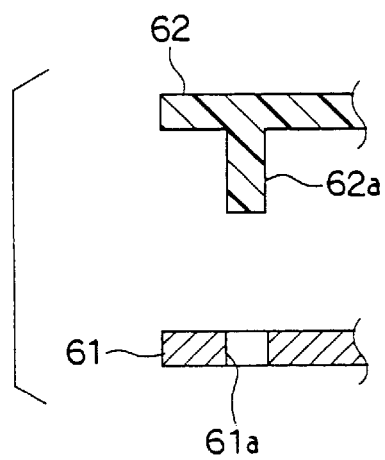
FIG. 19A is an enlarged partial cross-sectional view of portions prior to hot caulking.
Figure 19B:
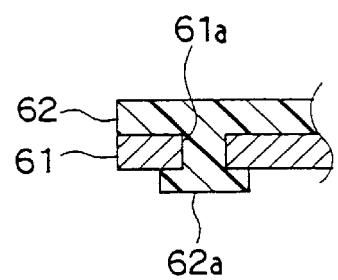
FIG. 19B is an enlarged partial cross-sectional view of portions after hot caulking.

As shown in FIG. 16, the surfaces of the cover 62 and the surfaces of the first division member 61 are fastened by heat caulking. FIGS. 19A and 19B are fragmentary enlarged sectional views of FIG. 16 for explaining the heat caulked structure. As shown in FIG. 19A, a plurality of projecting portions 62a projecting toward the peripheral edge of the first division member 61 are molded integrally with resin in the peripheral edge of the cover 62, while holes 61a into which the projecting portions 62a are inserted are formed in the peripheral edge of the first division member 61. As shown in FIG. 19B, the ends of the projecting portions 62a inserted into the holes 61a are subjected to the heat caulking causing the cover 62 and the first division member 61 to be joined.

The shorter the spacing (pitch) between the projecting portions 62a and the holes 31a, the stronger the joining of the cover 62 and the first division member 61 can be made. Therefore, the degree of strength is high with respect to the reinforcing function between when the first division member 61 and the cover 62. That is, the shorter the pitch of the heat caulking, the first division member 61 can be made thinner in wall thickness to achieve a lighter weight. With this in mind, preferably, the pitch of the heat caulking is less than 50 mm.

As described above, the air conditioning unit 50 and the blowing unit 52, the first division member 61, the wiring harness 70, the sheet member 63, and the cover 62 are integrally assembled into a module. The fixed portion 61c integrally molded in the portion on the vehicle forward side of the first division member 61 is secured to the partitioning wall (fire wall) between the inside of the passenger compartment and the engine compartment by fastening means, such as a screw. The assembled module body assembled as described above is held internally of the instrument board 10. There can be employed the structure for the air conditioning duct structure that is integrally assembled with the instrument board 10 into a module.

The main operation and effect according to the seventh embodiment will be explained hereinafter. As mentioned above, since the sheet member 63 is put between the first division member 61 and the cover 62 and fixed, securing of the sheet member 63 to the inner surface of the air conditioning duct 60 is facilitated as compared with the case where the conventional packing is adhered on the inner surface of the duct. Since the first division member 61 serves as part of the air conditioning duct 60, the space savings and weight reduction can be achieved as compared with the case where the first division member 61 is separated from the air conditioning duct 60.

Since the optical cable 71 is molded integrally with the sheet member 63, the conveying properties of the sheet member 63 and the optical cable 71 can be enhanced. Work for placing the optical cable 71 on the first division member 61 and work for placing the sheet member 63 on the first division member 61 can be combined into a single process, resulting in enhancing assembling of the pieces. When multiple optical cables 71 are present, it is suitable because the effect of enhancing the above-described conveying properties and assembling workability is great.

The sheet member 63 put between the first division member 61 and the cover 62 and fixed is placed over the wiring harness 70 to thereby secure the wiring harness 70 to the first division member 61. Since the sheet member 63 has the function of securing the wiring harness 70 to the first division member 61, the wiring harness 70 can be fixed without the exclusive-use fixing member for fixing the wiring harness 70 to reduce the number of parts.

The above-described fixing structure of the wiring harness 70 enhances the separating property of the wiring harness 70 in disassembling the air conditioning duct 60 to ease disassembly for recycling.

In the above-described fixing structure of the wiring harness 70, the wiring harness 70 and the optical cable 71 are covered by the sheet member 63. Therefore, the effect for protecting the wiring harness 70 and the optical cable 71 is also obtained, and the reduction in the number of parts is achieved as compared with the case where the exclusive-use protecting member used for protection is required.

In the above-described fixing structure of the wiring harness 70, the wiring harness 70 is fixed on the first division member 61 without locating the wiring harness 70 by gripping it by hand as in the prior art, thereby enhancing workability for fixing.

Since the configuration is employed in which the air conditioning unit 50 and the blowing unit 52, the first division member 61, the wiring harness 70, the sheet member 63 and the cover 62 can be assembled in one ordered direction from bottom to top, the assembling properties thereof is enhanced. Although in this embodiment, the air conditioning unit 50 and the blowing unit 52 can also be assembled in one ordered direction from bottom to top, the first division member 61, the wiring harness 70, the sheet member 63, and the cover 62, except both the units 50 and 52, may be assembled in one ordered direction from bottom to top.

Since the wiring harness 70 is located in the groove portion 63a of the sheet member 63, the wiring harness 70 can be securely fixed without deviating in position on the first division member 61. Since the first division member 61 and the cover 62 are joined by the heat caulking, the first division member 61 and the cover 62 can be joined without using screws, clips or the like, thereby reducing the number of parts involved. Further, by joining them by heat caulking, a plurality of locations can easily be joined simultaneously, thus enabling the joining of a plurality of locations in a short period of time.

(Eighth Embodiment)

Figure 20:
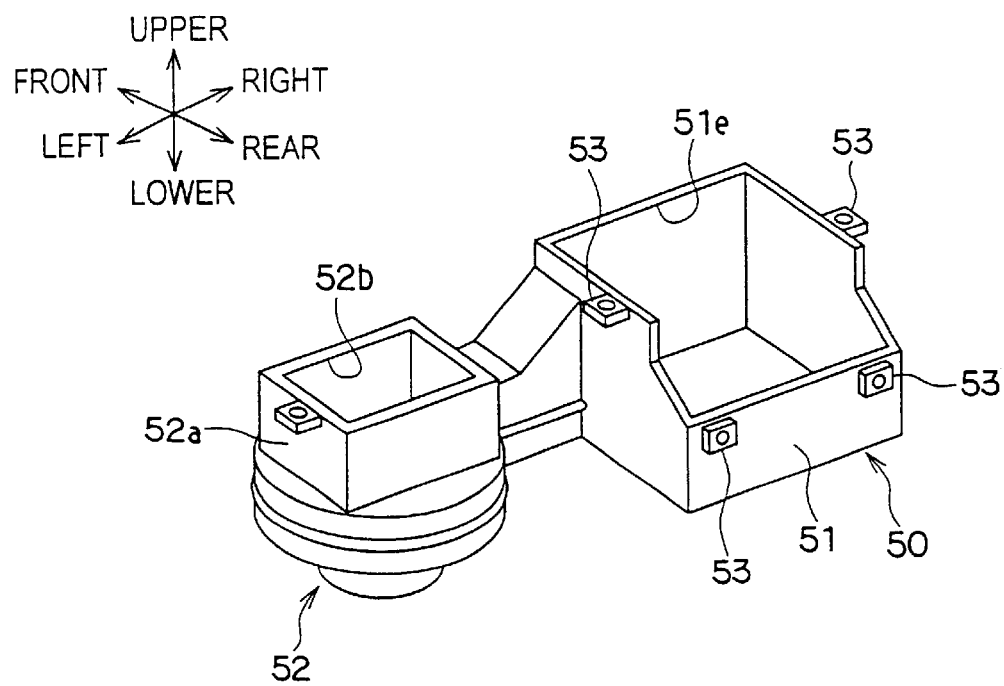
FIG. 20 is a perspective view of a structure of an air conditioner casing according to an eighth embodiment of the present invention.
Figure 21:
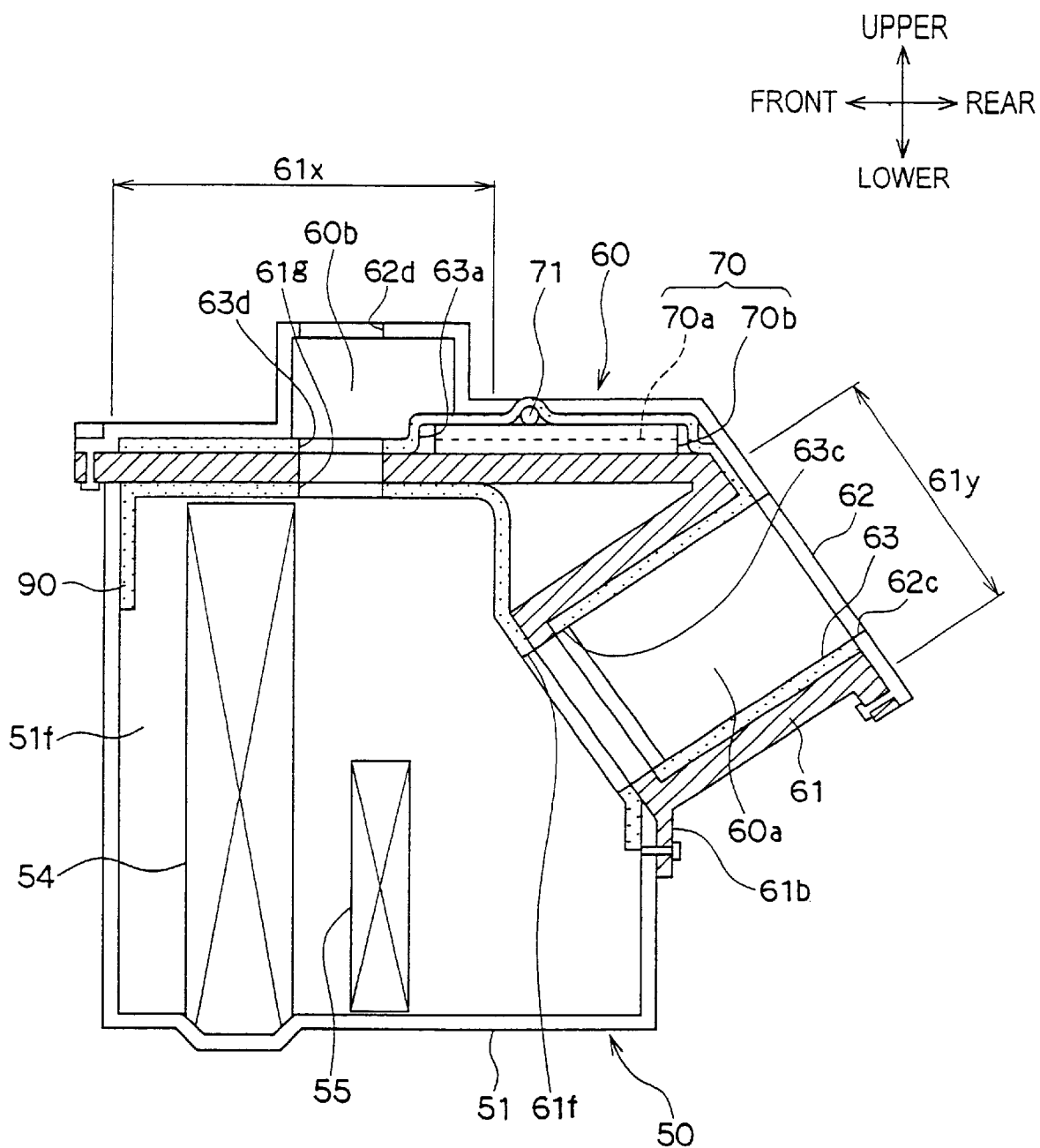
FIG. 21 is a cross-sectional view of the air conditioning duct structure according to the eighth embodiment.

FIG. 20 is a perspective view of an air conditioner casing 51 of an air conditioning unit 50 and a blowing case 52a of a blowing unit 52 according to another embodiment. Openings 51e and 52b are formed on the upper surface of the casings 51 and 52a. FIG. 21 is a partial cross-sectional view of the air conditioning unit 50 in the state that a first division member 61, a wiring harness 70, a sheet member 63, and a cover 62 are mounted on the air conditioning unit 50, and the blowing unit 52. It is noted that an air passage 51f within the air conditioner casing 51 is provided with a known cooling heat exchanger (evaporator) 54 and a heating heat exchanger (heater core) 55.

The first division member 61 has portions 61x and 61y serving as a casing constituting part of the casings 51 and 52a, and a heat insulating member 90 is provided on the portion facing the air passage 51f within the casings 51 and 52a out of the portions 61x and 61y serving as a casing. In this embodiment, the heat insulating member 90 is formed of a foaming resin (for example, polypropylene or urethane).

The first division member 61, the heat insulating member 90, the sheet member 63 and the cover 62 in this embodiment have openings 61g, 61f, 63c, 63d, 62c and 62d formed to be connected with the opening 51e of the air conditioner casing 51 so as to have the function similar to the center face opening 51a, the side face opening 51b and the defroster opening 51c of the air conditioner casing 51 in the seventh embodiment.

Similarly, the first division member 61, the heat insulating member 90, the sheet member 63 and the cover 62 in this embodiment have openings (not shown) formed to be connected with an opening 52b of the blower casing 52a so as to achieve the function similar to the inside air introducing opening and the outside air introducing opening of the blowing unit 52 in the seventh embodiment. A switching door (not shown) for opening and closing the inside and outside air introducing openings is provided within the blower casing 52a.

From the foregoing, the first division member 61 can serve as part of the casing 51, the upper surface portions of the air conditioner casing 51 and the blower casing 52a can be eliminated to implement the weight reduction of the casings 51 and 52a and a cost reduction.

The air conditioner casing 51 and the blower casing 52a, and the first division member 61 can be heat-insulated by the heat insulating member 90, and even if cool air should flow into the air passage 51f, it is possible to prevent moisture from adhering to the first division member 61. The heat insulating member 90 in this embodiment may be made of a foaming resin, and the function for attenuating vibrations propagating to the first division member 61 and the function for absorbing noises propagating into the air passage 51f of the casings 51 and 52a are performed.

(Other Embodiment)

In the seventh and eighth embodiments, the sheet member 63 is secured to the first division member 61 only by being interposed therebetween. If the sheet member 63 is interposed therebetween described above, and in addition, the sheet member 63 is closely secured to the internal surface of the first division member 61 by an adhesive, the vibration attenuation function of the sheet member 63 is easily enhanced. The vibration of high frequencies propagated from the first division member 61 to the steering apparatus is reduced to enhance a steering operation feeling felt by a driver-occupant.

In the seventh and eighth embodiments, the first division member 61 is made of metal. However, the first division member 61 in the present invention is not limited to metal. The first division member 61 may be made of resin such as glass-containing polypropylene.

In the seventh and eighth embodiments, a material of the cover 62 is selected so that the cover 62 may reinforce the strength of the first division member 61. However, the material in the present invention does not have to have a reinforcing function. For example, if a foaming resin (such as polypropylene and urethane) is used, the heat insulating function, the vibration attenuation function and the noise absorption function can be enhanced.

In the seventh and eighth embodiments, the optical cable 71 and the sheet member 63 are molded simultaneously. However, the present invention is not limited thereto. The optical cable 71 may be fixed by placing the sheet member 63 over the optical cable 71, similarly to the wiring harness 70, and thereby the groove portion 63a may be eliminated.

In the seventh and eighth embodiments, the first division member 61 serves as part of the air conditioning unit 60. However, the present invention can be applied even in the structure in which the air conditioning duct 60, which is formed by joining the first division member 61 and the second division member 62 in the direction extending across the vehicle's width, is formed separately from the reinforcing member having a reinforcing function and a support function, by interposing the sheet member 63 between the first and second division members 61 and 62.

The present invention can be applied even in the structure in which the air conditioning duct 60 is formed separately from the reinforcing member having the reinforcing function and the support function, by providing the reinforcing member with the sheet member 63 and covering the wiring harness 70 located on the reinforcing member 61 and fixing the sheet member 63 to the reinforcing member 61 so that the wiring harness 70 is fixed on the reinforcing member 61.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicular air-conditioning duct structure included in a beam member, comprising:
   at least two beam member bodies that are divisible longitudinally with respect to, and that form, the beam member; and
   a material for a duct integrated on an inner surface of each of the two beam member bodies, wherein the material for the duct has a heat-insulating property;
   wherein at least the two beam member bodies are joined such that joining surfaces of each of the at least two beam member bodies face each other in order to join the surfaces to form a closed, tubular portion wherein:
   the joining surfaces of the at least two beam member bodies are surfaces of the beam member bodies; and
   gradually changing portions for gradually changing the closed tubular structure in a vicinity of the joining surfaces are formed adjacent the joining surfaces, and the material for the duct is compressed by the gradually changing portions.

2. The vehicular air-conditioning duct structure according to claim 1, wherein the material for the duct is laminated and adhered to an inner surface of the beam member bodies.

3. The vehicular air-conditioning duct structure according to claim 1, wherein a fluid material for the duct is fixedly and integrally mounted by directly blowing the fluid material on an inner surface of the beam member bodies.

4. The vehicular air-conditioning duct structure according to claim 1, wherein material for the duct is integrated on a surface of a sheet material of a beam member, the material for the beam member being bent into a semi-tubular shape so that the material for the duct is positioned inside to form at least two beam member bodies, and
   the two beam member bodies are joined so that their semi-tubular surfaces face each other to join the semi-tubular surfaces.

5. The vehicular air-conditioning duct structure according to claim 1, wherein the material for the duct is integrated on the surface of the sheet material for the beam member, the material for the beam member being bent into a semi-tubular shape so that the material for the duct is positioned inside to form a first beam member body of at least two beam member bodies,
   wherein the second beam member body is formed in approximately a shape of a plane and integrated with the material for the duct, and
   surfaces of the beam member bodies having approximately a planer shape are combined so that the material for the duct is positioned inside the duct.

6. A vehicular air-conditioning duct structure included in a beam member, comprising:
   at least two beam member bodies divided in their longitudinal direction, the at least two beam member bodies forming the beam member; and
   at least two duct bodies divided in the longitudinal direction of the beam member and having a material for a duct molded into a predetermined shape, the at least two duct bodies being formed by a material having a heat-insulating property wherein,
   after the at least two duct bodies have been incorporated in an inside of the at least two beam member bodies, the at least two beam member bodies are combined so that respective joining surfaces of each beam member body are surfaces of the beam member bodies and face each other and join thereby forming a closed tubular structure; and gradually changing portions for gradually changing the closed tubular structure in a vicinity of the joining surfaces are formed adjacent the joining surfaces, and the material for the duct is compressed by the gradually changing portions.

7. A vehicular air-conditioning duct structure included in a beam member, comprising:
   two beam member bodies divided in a longitudinal direction of the beam member,
   wherein a material for a duct has a heat-insulating property and is integrated on an inner surface of the first beam member body;
   a duct body having the material for the duct molded into a predetermined shape and incorporated in the inside of the second beam member body; and
   at least two beam member bodies combined so that joining surfaces of each beam member body are surfaces of the beam member bodies and face each other in order to join the joining surfaces and form a closed, tubular structure; and gradually changing portions for gradually changing the closed tubular structure in a vicinity of the joining surfaces are formed adjacent the joining surfaces, and the material for the duct is compressed by the gradually changing portions.

8. The vehicular air-conditioning duct structure according to claim 1, wherein the material for the duct comprises sound absorbing properties.

9. The vehicular air-conditioning duct structure according to claim 4, wherein the material for the duct is integrated on an entire surface of one side of the sheet material for the beam member, and wherein the joining surfaces of at least two beam member bodies are joined with the material for the duct interposed between the joining surfaces.

10. The vehicular air-conditioning duct structure according to claim 1, wherein closed portions for closing an internal space of the beam member are molded integrally on both ends of each beam member body.

11. The vehicular air-conditioning duct structure according to claim 10, wherein separate side brackets are joined to respective ends of the beam member.

12. The vehicular air-conditioning duct structure according to claim 1, wherein integral side brackets are molded to the beam member bodies and protrude radially outward on each end, at 90 degrees to the longitudinal axis of the beam member bodies, and wherein an opening, defined by each beam member, located at each end of the beam member, is closed by a separate cap member.

13. The vehicular air-conditioning duct structure according to claim 11, wherein the beam member is arranged inside of a vehicle instrument board and is used as a structural member for supporting a vehicle steering system, wherein both ends of the beam member are secured by the side brackets.

14. The vehicular air-conditioning duct structure according to claim 1, wherein wiring holding portions for holding vehicle wiring parallel to the longitudinal axis of the beam member are integrally molded with the beam member.

15. The vehicular air-conditioning duct structure according to claim 14 wherein wiring protective members arranged inside of the wiring holding portions to surround the vehicle wiring are integrally molded with the duct material.

16. The vehicular air-conditioning duct structure according to claim 14, wherein wiring protective members arranged inside of the wiring holding portions to surround the vehicle wiring, are separately molded from the duct material.

17. The vehicular air-conditioning duct structure according to claim 1, wherein after a ventilation path partitioning member for partitioning a ventilation path inside of the beam member is incorporated between at least two beam member bodies, the end surfaces of the at least two beam member bodies are joined.

18. The vehicular air-conditioning duct structure according to claim 17, wherein an opening shape of the ventilation path outlet side of the ventilation path partitioning member is a flat shape coinciding with the longitudinal direction of the beam member.

19. The vehicular air-conditioning duct structure according to claim 1, wherein a pitch of a joining portion for joining the joining surfaces of at least two beam member bodies is not more than 200 mm.

20. A vehicular air-conditioning duct structure comprising:

a beam member for supporting a steering system, wherein the beam member is hollow and comprises of at least two beam member bodies joined together at tapered-shaped joining surfaces, wherein the at least two beam member bodies are comprised of a sheet metal; and a duct for delivering conditioned air, wherein the duct is provided within the hollow beam member, wherein the duct is comprised of plurality of duct bodies adhered to an inner internal wall of the beam member, wherein each of the plurality of duct bodies is comprised of a resin foam material to provide a heat-insulating sound absorbing property to thereby attenuate vibration and absorb noise propagating in the duct, wherein outer peripheral edges of the plurality of duct bodies are compressed by the tapered shaped joining surfaces to thereby seal the plurality of duct bodies within a sealing area.

21. The vehicular air-conditioning duct structure according to claim 20, wherein wiring holding portions for holding vehicle wiring parallel to the longitudinal axis of the beam member are integrally molded with the beam member.

22. The vehicular air-conditioning duct structure according to claim 20 wherein wiring protective members arranged inside of the wiring holding portions to surround the vehicle wiring are integrally molded with the duct material.

23. The vehicular air-conditioning duct structure according to claim 20, wherein wiring protective members arranged inside of the wiring holding portions to surround the vehicle wiring, are separately molded from the duct material.

24. A vehicular air-conditioning duct included in a beam member, the vehicle air-conditioning duct structure comprising:

a first beam member body;

a second beam member body attached to said first beam member body to form the beam member, the first and second beam member bodies being divisible longitudinally;

a material attached to an inner surface of each of the first and second beam member bodies, the material forming the duct, the material having heat-insulation properties greater than heat-insulation properties of the first and second beam member bodies.

25. The vehicular air-conditioning duct structure according to claim 24, wherein wiring holding portions for holding vehicle wiring parallel to the longitudinal axis of the beam member are integrally molded with the beam member.

26. The vehicular air-conditioning duct structure according to claim 25, wherein wiring protective members arranged inside of the wiring holding portions to surround the vehicle wiring are integrally molded with the duct material.

27. The vehicular air-conditioning duct structure according to claim 25, wherein wiring protective members arranged inside of the wiring holding portions to surround the vehicle wiring, are separately molded from the duct material.

* * * * *